(12) United States Patent
Cha et al.

(10) Patent No.: US 11,566,952 B2
(45) Date of Patent: Jan. 31, 2023

(54) TENSILE FORCE DETECTING DEVICE WITH ELASTIC ELEMENTS

(71) Applicant: KOREA INSTITUTE OF SCIENCE AND TECHNOLOGY, Seoul (KR)

(72) Inventors: Youngsu Cha, Seoul (KR); Hojoon Kim, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 0 days.

(21) Appl. No.: 16/951,728

(22) Filed: Nov. 18, 2020

(65) Prior Publication Data

US 2022/0042864 A1    Feb. 10, 2022

(30) Foreign Application Priority Data

Aug. 6, 2020    (KR) .................. 10-2020-0098607

(51) Int. Cl.
   *G01L 1/16*    (2006.01)

(52) U.S. Cl.
   CPC ...................... *G01L 1/16* (2013.01)

(58) Field of Classification Search
   CPC ......... G01L 5/0033; G01L 5/167; G01L 1/16; G01N 2203/0032; G01N 2203/0623; G01N 2203/0282; G01N 2203/0017
   See application file for complete search history.

(56) References Cited

U.S. PATENT DOCUMENTS

| | | | | |
|---|---|---|---|---|
| 4,734,044 A * | 3/1988 | Radice | ................ | H01L 41/0475 310/365 |
| 5,136,202 A * | 8/1992 | Carenzo | ................ | B65H 59/40 310/319 |
| 7,181,977 B2 * | 2/2007 | Thompson | ................ | G01L 1/16 73/777 |
| 7,390,157 B2 * | 6/2008 | Kramer | ................ | G06F 3/011 414/5 |
| 8,056,423 B2 * | 11/2011 | Abdallah | ................ | G01L 5/226 73/826 |
| 8,091,437 B2 * | 1/2012 | Stumpf | ................ | G01D 18/00 73/862.041 |
| 8,371,177 B2 * | 2/2013 | Ihrke | ................ | B25J 9/1045 73/826 |
| 9,070,286 B2 * | 6/2015 | Moore | ................ | H01L 41/1132 |
| 9,171,965 B2 * | 10/2015 | Takenaka | ................ | G01L 5/162 |
| 9,635,466 B2 * | 4/2017 | Kappus | ................ | H04R 17/00 |
| RE46,499 E * | 8/2017 | Face | ................ | H03K 17/964 |
| 10,153,713 B2 * | 12/2018 | Petroni | ................ | H01L 41/1136 |
| 10,168,235 B1 * | 1/2019 | Chuang | ................ | B65D 79/02 |
| 10,379,654 B2 * | 8/2019 | Li | ................ | G01L 1/20 |

(Continued)

FOREIGN PATENT DOCUMENTS

| | | |
|---|---|---|
| JP | 5299663 B2 | 9/2013 |
| JP | 2018038704 A | 3/2018 |

(Continued)

*Primary Examiner* — Tran M. Tran
(74) *Attorney, Agent, or Firm* — Rabin & Berdo, P.C.

(57) ABSTRACT

The present disclosure provides a tensile force detecting device including a piezoelectric element to generate an electrical signal by a load, the elastic thread connected to the piezoelectric element to support the load applied to the piezoelectric element, and a sewing thread connected to the piezoelectric element to transmit the load to the piezoelectric element.

10 Claims, 32 Drawing Sheets

(56) References Cited

U.S. PATENT DOCUMENTS

| | | | |
|---|---|---|---|
| 10,512,421 B2 * | 12/2019 | Kawamura | A61B 5/6831 |
| 10,653,190 B2 * | 5/2020 | Longinotti-Buitoni | ...................... A42B 1/046 |
| 10,842,413 B2 * | 11/2020 | Hsu | A61B 5/389 |
| 10,852,825 B2 * | 12/2020 | Yoon | G06F 3/014 |
| 10,950,779 B2 * | 3/2021 | Tajitsu | H01L 41/0986 |
| 11,023,047 B2 * | 6/2021 | Holbery | G06F 3/016 |
| 11,061,476 B2 * | 7/2021 | Remaley | G06F 3/016 |
| 2015/0248159 A1 * | 9/2015 | Luo | G06F 3/011 345/156 |
| 2016/0022212 A1 | 1/2016 | Moore et al. | |
| 2017/0059421 A1 | 3/2017 | Servati et al. | |
| 2017/0238844 A1 | 8/2017 | Cunningham | |
| 2018/0008196 A1 | 1/2018 | Connor | |
| 2019/0386198 A1 * | 12/2019 | Ando | G01B 7/16 |
| 2020/0249197 A1 * | 8/2020 | Chou | A61B 5/297 |
| 2020/0370982 A1 * | 11/2020 | Won | G01L 19/0092 |
| 2022/0291017 A1 * | 9/2022 | Kappert | G01D 3/08 |

FOREIGN PATENT DOCUMENTS

| | | |
|---|---|---|
| KR | 101019404 B1 | 3/2011 |
| KR | 101331858 B1 | 11/2013 |
| KR | 102036360 B1 | 10/2019 |

* cited by examiner

FIG. 8

| Angle | $\zeta$ | R-square |
|---|---|---|
| $\theta_{S-ab/ad}$ | 1.145 | 0.9859 |
| $\theta_{S-hab/had}$ | 0.8603 | 0.9624 |
| $\theta_{S-in/ex}$ | 3.332 | 0.9756 |
| $\theta_{W-fl/ex}$ | 2.902 | 0.9263 |
| $\theta_{W-ra/ul}$ | 0.6449 | 0.7419 |
| $\theta_{W-pr/su}$ | 1.65 | 0.9857 |
| $\theta_{E-fl/ex}$ | 1.533 | 0.9211 |

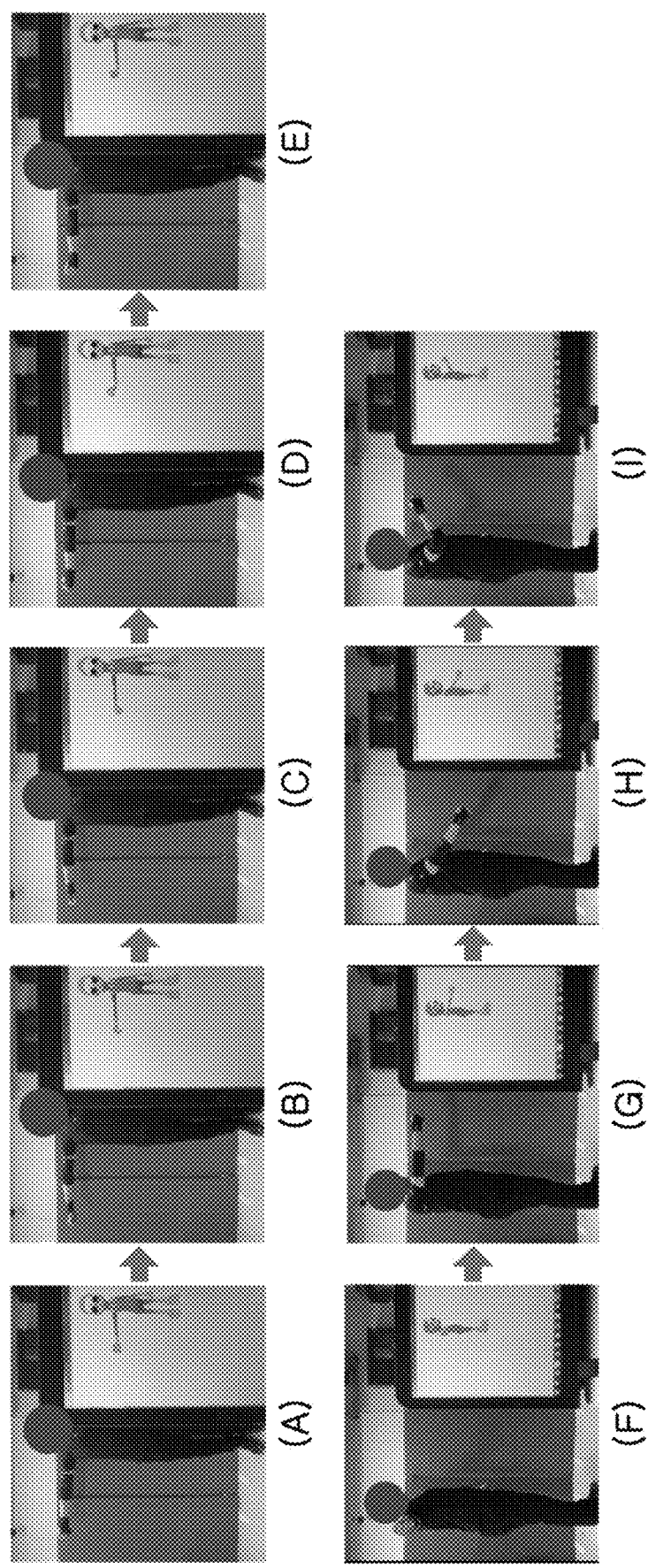

TENSILE FORCE DETECTING DEVICE WITH ELASTIC ELEMENTS

CROSS-REFERENCE TO RELATED APPLICATION

This application claims priority to Korean Patent Application No. 10-2020-0098607, filed on Aug. 6, 2020, and all the benefits accruing therefrom under 35 U.S.C. § 119, the contents of which in its entirety are herein incorporated by reference.

BACKGROUND

1. Field

The present disclosure relates to a tensile force detecting device, and more particularly, to a tensile force detecting device of a very flexible and lightweight structure.

2. Description of the Related Art

A biological model is known as inspiration for overcoming complex biological problems in various fields, especially, various attempts to improve the mechanical structure by emulating the biological structure in the industry of robotics engineering.

In the biological model, tendons are the important source of inspiration for transmitting forces to muscles and improving the stability of joints.

The tendons glide between muscles and bones while maintaining elasticity based on a fibrous anatomical structure that is very strong against mechanical loads. Using this structural advantage, many attempts have been made to emulate muscle-tendon complexes in the form of actuators and sensors in the industry of robotics engineering.

Among various platforms and materials for robotics engineering application, smart materials are regarded as promising materials for emulating biological entities due to their high flexibility, weight and reactivity to external stimuli, and make it possible to incorporate intelligent into robotic systems.

Bio-inspired smart sensors such as smart fabrics and polymer based smart skins have been reported. Additionally, suggestions have been made on actuators based on ionic polymer metal composite, shape memory alloys and dielectric elastomers to emulate the biological structure.

Due to various options for smart materials, piezoelectric materials are widely used in the field of robotics engineering because of their flexibility and piezoelectric property advantages resulting from combined reactions between mechanical deformation and electric charges.

Accordingly, there is a need for development of a tensile force detecting device of a very flexible and lightweight structure.

RELATED LITERATURES

Patent Literatures

Patent No. 10-1019404 (2011.3.7)

SUMMARY

The present disclosure is designed to solve the above-described problem, and therefore the present disclosure is directed to providing a tensile force detecting device of a very flexible and lightweight structure.

To solve the above-described problem, a tensile force detecting device of the present disclosure includes a piezoelectric element to generate an electrical signal by a load, the elastic thread connected to the piezoelectric element to support the load applied to the piezoelectric element, and a sewing thread connected to the piezoelectric element to transmit the load to the piezoelectric element.

The load may be a tensile load.

In an example related to the present disclosure, the piezoelectric element may include a piezoelectric film of polyvinylidene fluoride, and a substrate electrode connected to the piezoelectric film.

Additionally, the substrate electrode may be attached to one end of the piezoelectric film by a carbon bonding adhesive tape.

In another example related to the present disclosure, the piezoelectric element may further include a polyethylene terephthalate (PET) substrate disposed in contact with the piezoelectric film, a first PET part disposed on one side of the piezoelectric film having the attached substrate electrode to transmit the load to the piezoelectric film, and a second PET part disposed on the other side of the piezoelectric film to transmit the load to the piezoelectric film.

A fixed area may be an area in which the piezoelectric film is coupled to the PET substrate by the first PET part, a tensile force applied area may be an area in which the second PET part is attached to the piezoelectric film, and a detection area may be between the fixed area and the tensile force applied area.

The fixed area may have an elastic hole that passes through the PET substrate to install the elastic thread.

Additionally, the tensile force applied area may have a connection hole that passes through the piezoelectric film and the second PET part to install the sewing thread.

BRIEF DESCRIPTION OF THE DRAWINGS

FIG. 8 is a table showing angle, R-square and ζ values as a result of an elasticity test.

FIG. 12 is a photographic image showing an example of real-time movement sensing in (A) normal condition in the front, (B) shoulder internal rotation, (C) wrist rotation, (D) wrist radial deviation, (E) wrist flexion, (F) normal condition in the side, (G) shoulder horizontal adduction, (H) shoulder extension and (I) elbow extension.

DETAILED DESCRIPTION

Hereinafter, the disclosed embodiments will be described in detail with reference to the accompanying drawings, and identical or similar elements are given identical or similar reference signs and redundant descriptions are omitted herein. As used herein, the suffix "part" is only given or used to ease the drafting of the specification, and does not have any meaning or role for identifying itself. Additionally, in describing the embodiments disclosed herein, when it is determined that a certain detailed description of relevant known technology may make the key subject matter of the disclosed embodiments ambiguous, the detailed description is omitted herein. Additionally, the accompanying drawings are provided for an easy understanding of the disclosed embodiments, and the technical spirit disclosed herein is not limited by the accompanying drawings, and it should be understood that the present disclosure covers all modifications, equivalents or substitutes falling in the spirit and technical scope of the present disclosure.

The terms "first", "second", and the like may be used to describe various elements, but the elements are not limited by the terms. These terms are used to distinguish one element from another.

It will be understood that when an element is referred to as being "connected to" another element, the element can be connected to the other element, but intervening elements may be present.

Unless the context clearly indicates otherwise, the singular forms include the plural forms as well.

It should be understood that the term "comprises" or "includes" when used in this specification, specifies the presence of stated features, integers, steps, operations, elements, components or groups thereof, but does not preclude the presence or addition of one or more other features, integers, steps, operations, elements, components, or groups thereof.

Figure 1A:
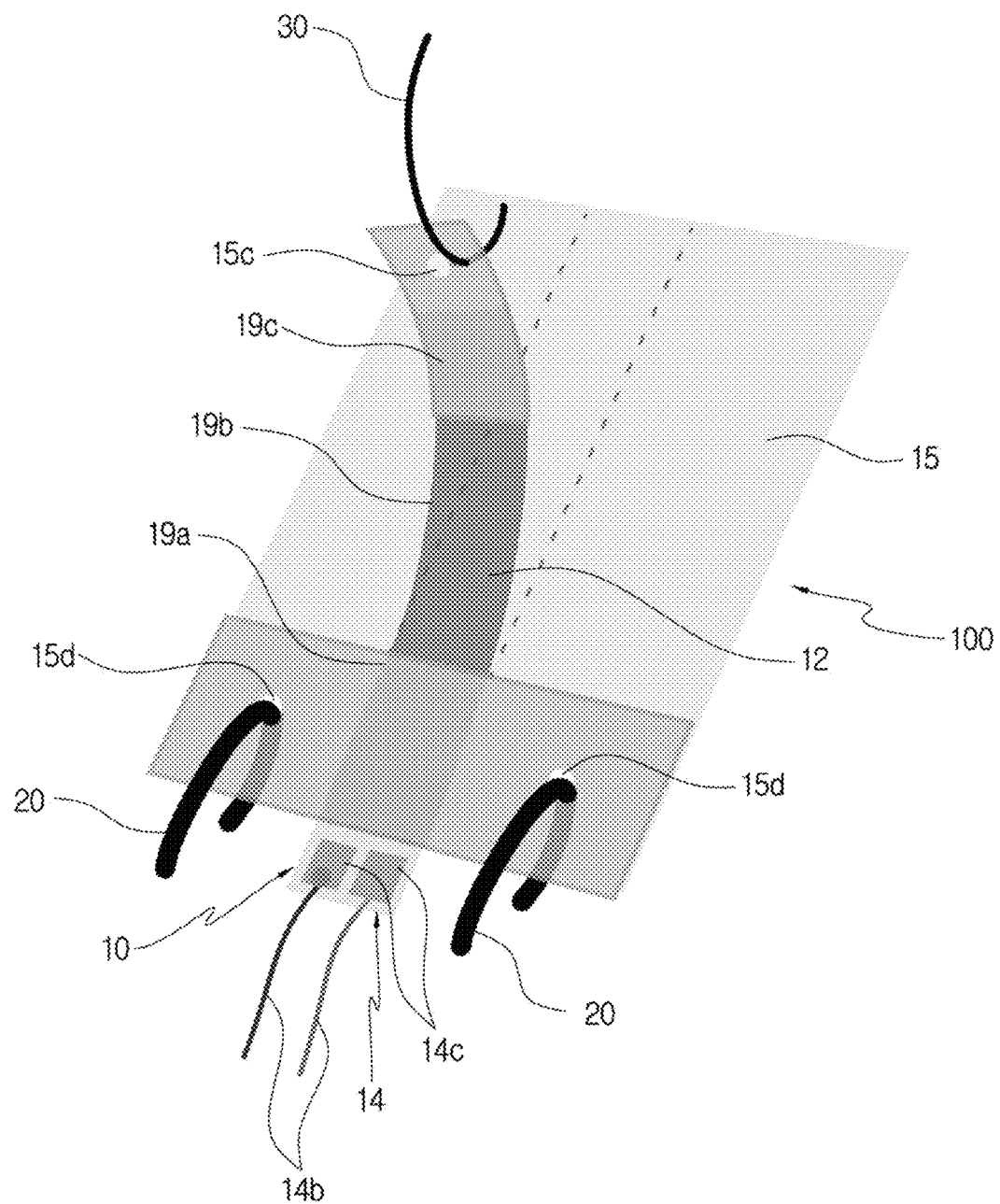
FIG. 1A is a perspective view showing a tensile force detecting device of the present disclosure.
Figure 1B:
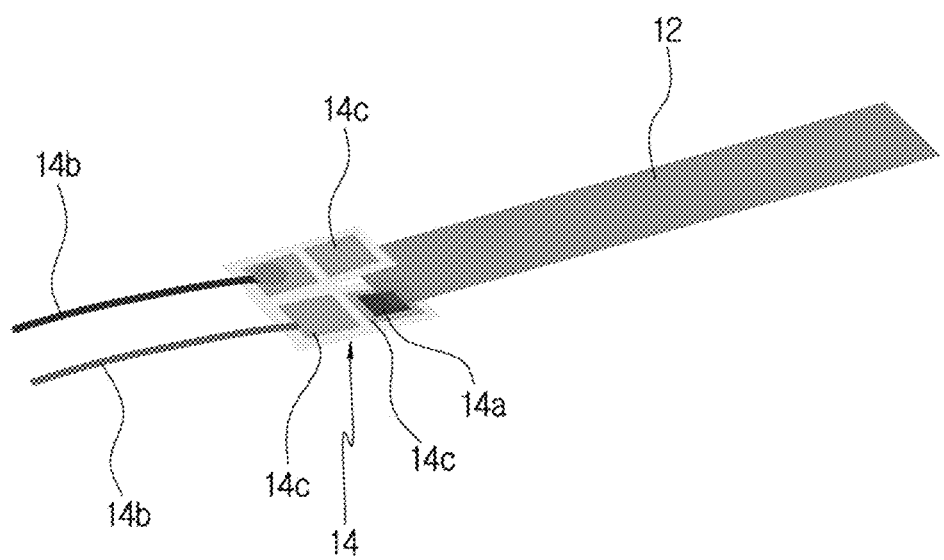
FIG. 1B is a perspective view showing a piezoelectric element.
Figure 1C:
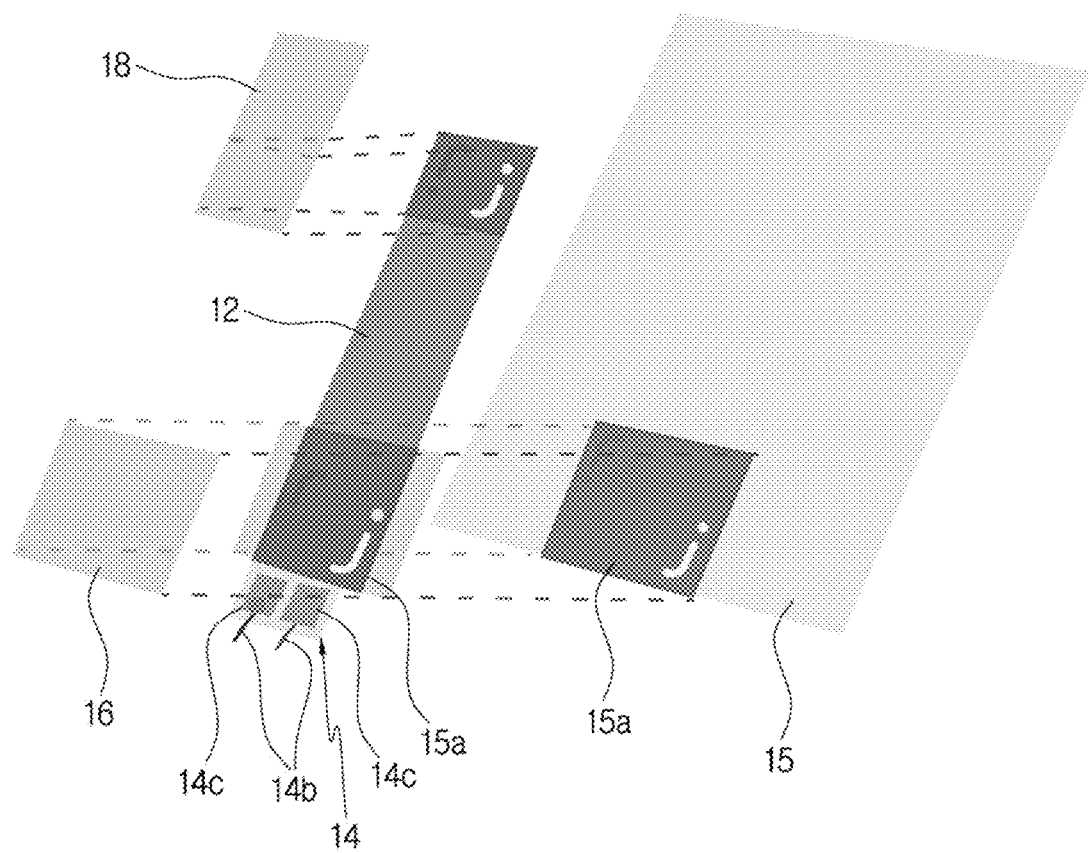
FIG. 1C is a perspective view showing an example of a polyethylene terephthalate (PET) substrate, a first PET part, a second PET part coupled to a piezoelectric film.
Figure 1D:
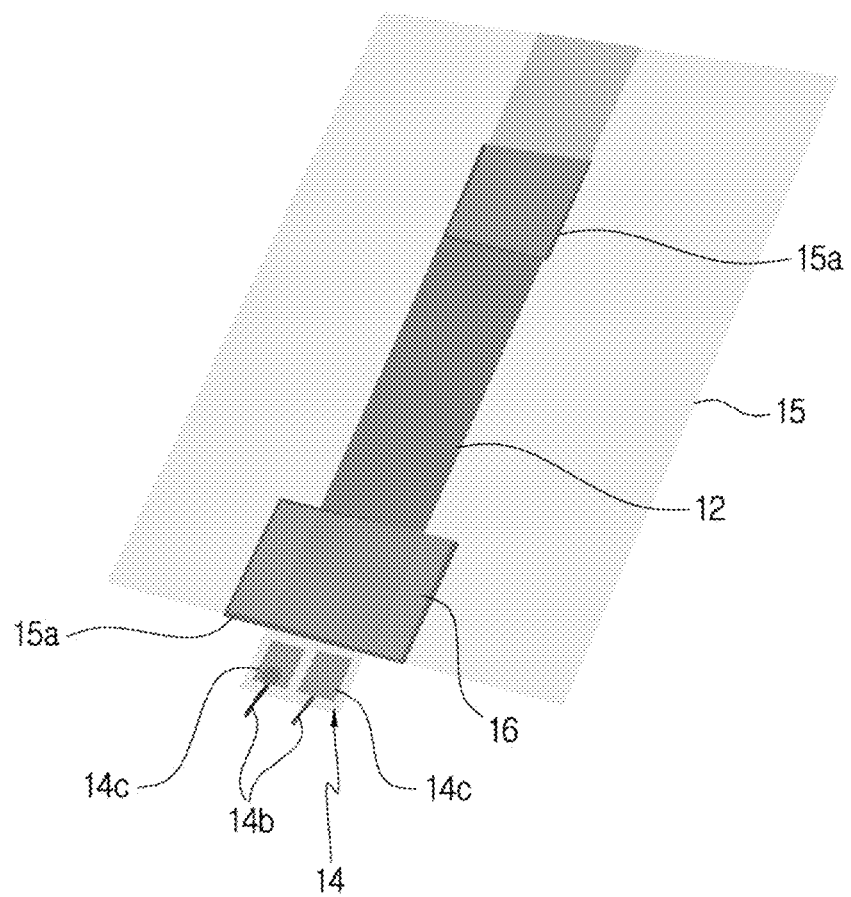
FIG. 1D is a perspective view showing an example of curing of the components of FIG. 1C.
Figure 1E:
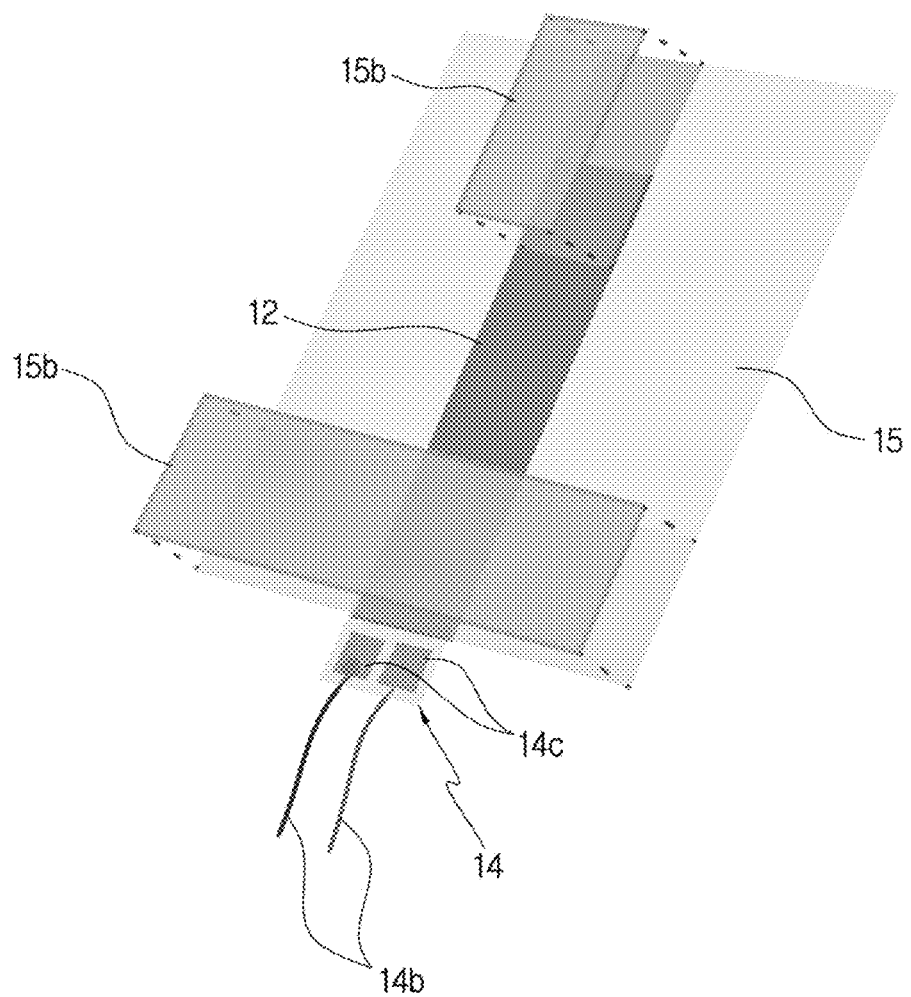
FIG. 1E is a perspective view showing an example of a Kapton® tape attached to the components of FIG. 1D.

FIG. 1A is a perspective view showing a tensile force detecting device 100 of the present disclosure, and FIG. 1B is a perspective view showing a piezoelectric element 10. Additionally, FIG. 1C is a perspective view showing an example of a polyethylene terephthalate (PET) substrate 15, a first PET part 16 and a second PET part 18 coupled to a piezoelectric film 12, FIG. 1D is a perspective view showing an example of curing of the components of FIG. 1C, and FIG. 1E is a perspective view showing an example of a Kapton® tape 15b attached to the components of FIG. 1D.

Hereinafter, the structure of the tensile force detecting device 100 for measuring a tensile load will be described.

The tensile force detecting device 100 of the present disclosure is motivated by the working principle of tendons.

The tensile force detecting device 100 of the present disclosure includes a piezoelectric element 10, an elastic thread 20 and a sewing thread 30.

The piezoelectric element 10 generates an electrical signal (voltage) by a tensile load.

The piezoelectric element 10 may include a piezoelectric film 12 and a substrate electrode 14.

For example, the piezoelectric element 10 may be a piezoelectric sensor that generates an electrical signal when subjected to a load.

The tensile force detecting device 100 of the present disclosure is tendon-inspired, and mechanical deformation of the tensile force detecting device 100 transmits the tensile load to the piezoelectric element 10 in the device. Additionally, an electrical response to the tensile load applied to the piezoelectric element 10 may be measured and compared with a theoretical expected value.

The piezoelectric film 12 may be made of polyvinylidene fluoride (PVDF) having high flexibility. Additionally, the piezoelectric film 12 may be, for example, 25 mm in length and 5 mm in width.

The substrate electrode 14 may be attached to one end of the piezoelectric film 12 by a carbon bonding adhesive tape 14a.

An electrode part 14c of the substrate electrode 14 may be electrically connected to an electrical wire 14b to transmit the measured electrical signal to a data collector (not shown).

Additionally, the piezoelectric element 10 may further include a PET substrate 15, a first PET part 16 and a second PET part 18.

The PET substrate 15 is disposed in contact with the piezoelectric film 12. For example, the piezoelectric film 12 may be attached to the PET substrate 15 by an epoxy glue 15a.

The first PET part 16 is disposed on one side of the piezoelectric film 12 having the substrate electrode 14 attached thereto. For example, the first PET part 16 may be disposed such that it is attached to one side of the piezoelectric film 12 through the epoxy glue 15a.

The width of the first PET part 16 may be wider than the piezoelectric film 12, so that one side of the piezoelectric film 12 may be fixed to the PET substrate 15 by the first PET part 16.

For example, the first PET part 16 may have dimensions of 10 mm in length and 10 mm in width.

The second PET part 18 may be disposed on the other side of the piezoelectric film 12 to transmit the tensile load to the piezoelectric film 12.

Half of the second PET part 18 may be attached to the piezoelectric film 12, and the width of the second PET part 18 may be equal to the piezoelectric film 12, so that the area of the piezoelectric film 12 where the second PET part 18 is attached may be freely detached from the PET substrate 15.

For example, the second PET part 18 may have the dimensions of 5 mm×10 mm.

Referring to FIG. 1A, a fixed area 19*a* in which the piezoelectric film 12 is coupled to the PET substrate 15 by the first PET part 16, a tensile force applied area 19*c* in which the second PET part 18 is attached to the piezoelectric film 12, and a detection area 19*b* between the fixed area 19*a* and the tensile force applied area 19*c* are shown.

The fixed area 19*a* may have an elastic hole 15*d* that passes through the Kapton® tape 15*b* and the PET substrate 15 to install the elastic thread 20 as described below.

The tensile force applied area 19*c* may have a connection hole 15*c* that passes through the second PET part 18 and the Kapton® tape 15*b* to install the sewing thread 30 as described below.

The elastic thread 20 is connected to the PET substrate 15 to support the load applied to the piezoelectric element 10. Additionally, the elastic thread 20 allows the tensile force detecting device 100 to glide. The elastic thread 20 may be made of a fiber such as, for example, polyester, or rubber.

The elastic thread 20 may be connected to one side of the piezoelectric element 10. For example, the elastic thread 20 may be connected to the piezoelectric element 10 through the elastic hole 15*d* formed in the fixed area 19*a* of the piezoelectric element 10.

The sewing thread 30 is connected to the piezoelectric element 10 to transmit the tensile load to the piezoelectric element 10.

The sewing thread 30 may be connected to the other side of the piezoelectric element 10. For example, the sewing thread 30 may be connected to the piezoelectric element 10 through the connection hole 15*c* formed in the tensile force applied area 19*c* of the piezoelectric element 10.

The sewing thread 30 may be polyester, and for example, 100% polyester.

The tendon-inspired tensile force detecting device 100 of the present disclosure realizes the elastic properties of tendons by the elastic thread 20, the sewing thread 30 and the piezoelectric element 10.

The tensile force detecting device 100 of the present disclosure may be used as a detection structure to support a high tensile load using a general component.

An avatar is synchronized well with movements of arms and legs of a subject. The present disclosure provides an insight for the detection characteristics of the tensile force detecting device 100 and gives the possibility of biometric application.

In detail, the tensile force detecting device 100 of the present disclosure emulates the fibrous elastic structure of tendons, thereby detecting a wide range of tensile loads, free from tensile fatigue behavior. Additionally, the sensor in combination with the sewing thread 30 and elastic thread 20 is very suitable for severe environments such as small joints in the human body.

Hereinafter, an example of a method for fabricating the tensile force detecting device 100 of the present disclosure will be described.

The tendon-inspired tensile force detecting device 100 primarily includes the piezoelectric film 12 layer (thickness: 28 μm) and the PET substrate (thickness: 100 μm). Referring to FIGS. 1A to 1E, the sensor fabrication process may be understood. The piezoelectric film 12 (Measurement Specialties, Inc) is cut into the length of 25 mm and the width of 5 mm. Additionally, as shown in FIG. 1B, the substrate electrode 14, which is a flexible printed circuit board (FPCB), is attached to the end of the piezoelectric film 12 layer using the Kapton® tape 15*b* (Nisshin EM Co., Ltd.). Subsequently, some areas of the piezoelectric film 12 are attached to the PET substrate 15 with the length of 10 mm using an epoxy adhesive (DP460, 3M Co., Ltd.).

The piezoelectric film 12 is placed as shown in FIG. 1C. An area of the first PET part 16 attached to the piezoelectric film 12 is covered with an epoxy adhesive to strengthen the support between the piezoelectric film 12 and the PET substrate 15. Additionally, the second PET part 18 is used as a medium that transmits a tensile load to the piezoelectric film 12 layer. Half of the second PET part 18 is attached to the other end of the piezoelectric film 12 layer by an epoxy adhesive. One side of the piezoelectric film 12 layer is fixed to the substrate and the other side is free. Referring to FIG. 1D, the coupled structure of the PET and the piezoelectric film 12 is cured for a day at room temperature.

After the curing process, the coupled tape is additionally covered with the Kapton® tape 15*b* for additional support as shown in FIG. 1E.

Referring to FIG. 1A, an area in which the first PET part 16 is coupled with the main PET substrate is indicated as the "fixed area 19*a*", a free central piezoelectric film 12 area is indicated as the "detection area 19*b*", and an area in which the second PET part 18 is coupled is indicated as the "tensile force applied area 19*c*". The fixed area 19*a* has two elastic holes 15*d*, which are connected to the elastic thread 20 as described above.

The connection hole 15*c* is formed in the middle of the tensile force applied area 19*c* and connected to the sewing thread 30. The tensile load is transmitted to the detection area 19*b* through the sewing thread 30 connected in the tensile force applied area. In this instance, the elastic thread 20 of the fixed area 19*a* helps the tensile force detecting device 100 to glide with resistance to the given tensile load.

The capacitance of the piezoelectric film 12 layer is 490 pF and is measured through a graphical sampling multimeter (DMM7510, 7 12-Digit Graphical Sampling Multimeter Tektronix, Inc.).

Hereinafter, tensile testing performed by the tensile force detecting device 100 of the present disclosure will be described.

A. Test Setup

Figure 3:
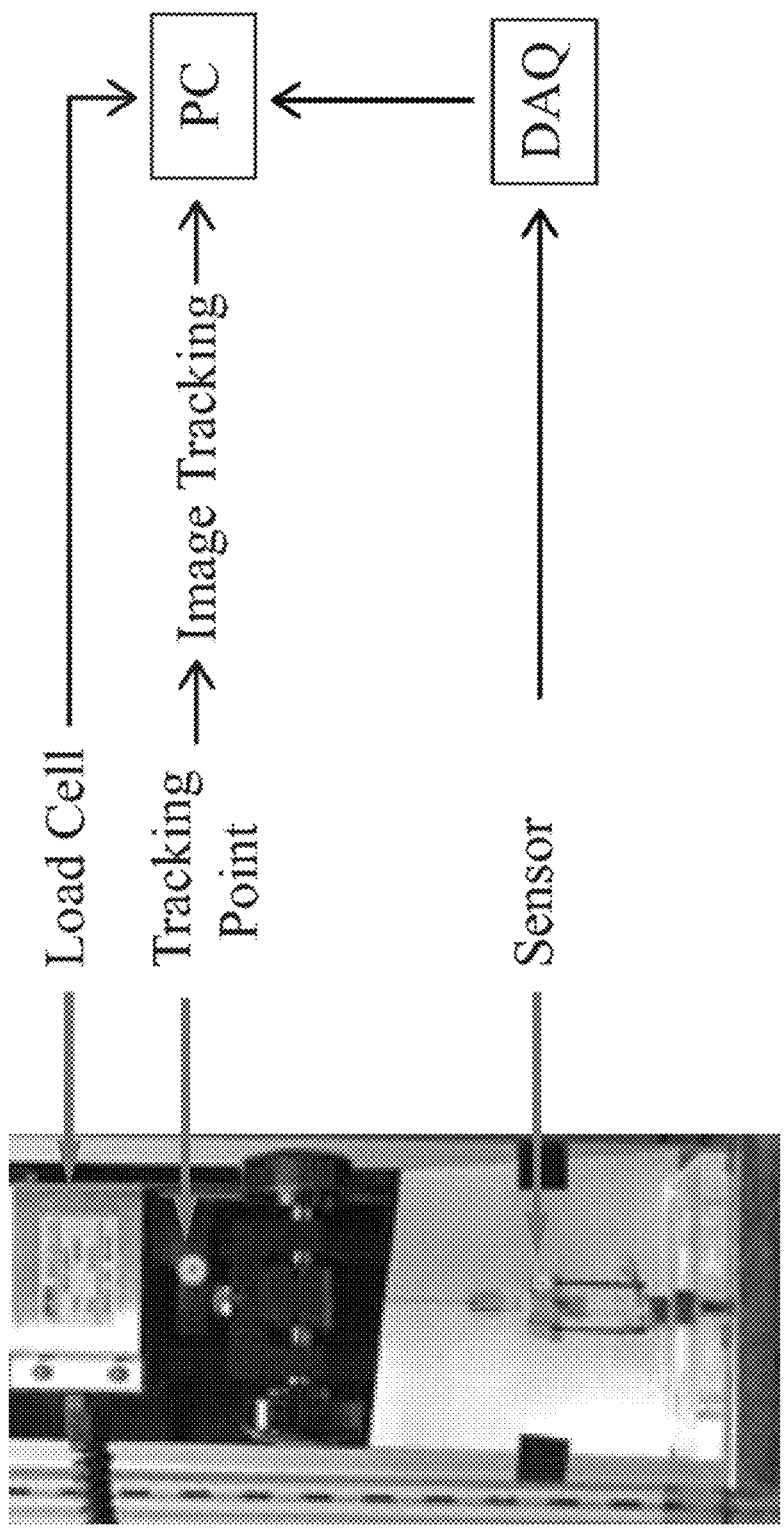
FIG. 3 is a conceptual view showing test setup performed through a tensile force detecting device of the present disclosure.

To analyze the electrical and mechanical properties of the tendon-inspired tensile force detecting device 100, test setup for applying a tensile load to the tensile force detecting device 100 is as shown in FIG. 3.

FIG. 3 shows experimental setup to apply tensile loading to the sensor using tensile testing machine (MCT-2150, A & D Co., Ltd). In the fixed area 19*a* of the piezoelectric element 10, two 50 mm long elastic threads 20 are connected to an acryl bracket. Additionally, in the tensile force applied area 19*c*, a 50 mm long sewing thread 30 is connected to a tensile jig. The tensile tester stretches the tensile force detecting device 100 from 0 to 19 mm, and a load cell measures a force at the elongation of the piezoelectric element 10 at the uniform rate of 100 mm/min.

Additionally, time tracking elongation of the tensile tester is recorded through a camera (DSC-RX10M3, Sony Corp.) at the rate of 60 fps. Afterwards, the recorded movements of tracking points are analyzed using a post-processing tracking program (ProAnalyst Motion Analysis Software, Xcitex, Inc.). During elongation, electrical responses from the piezoelectric element 10 are collected by a data collection board (DAQ, NI-6211, National Instrument Corp.) of LabView 2017. The load resistance of 100 MΩ is used, and the sampling frequency of the data collection board is 2 kHz.

B. Mechanical Deformation

Figure 4A:
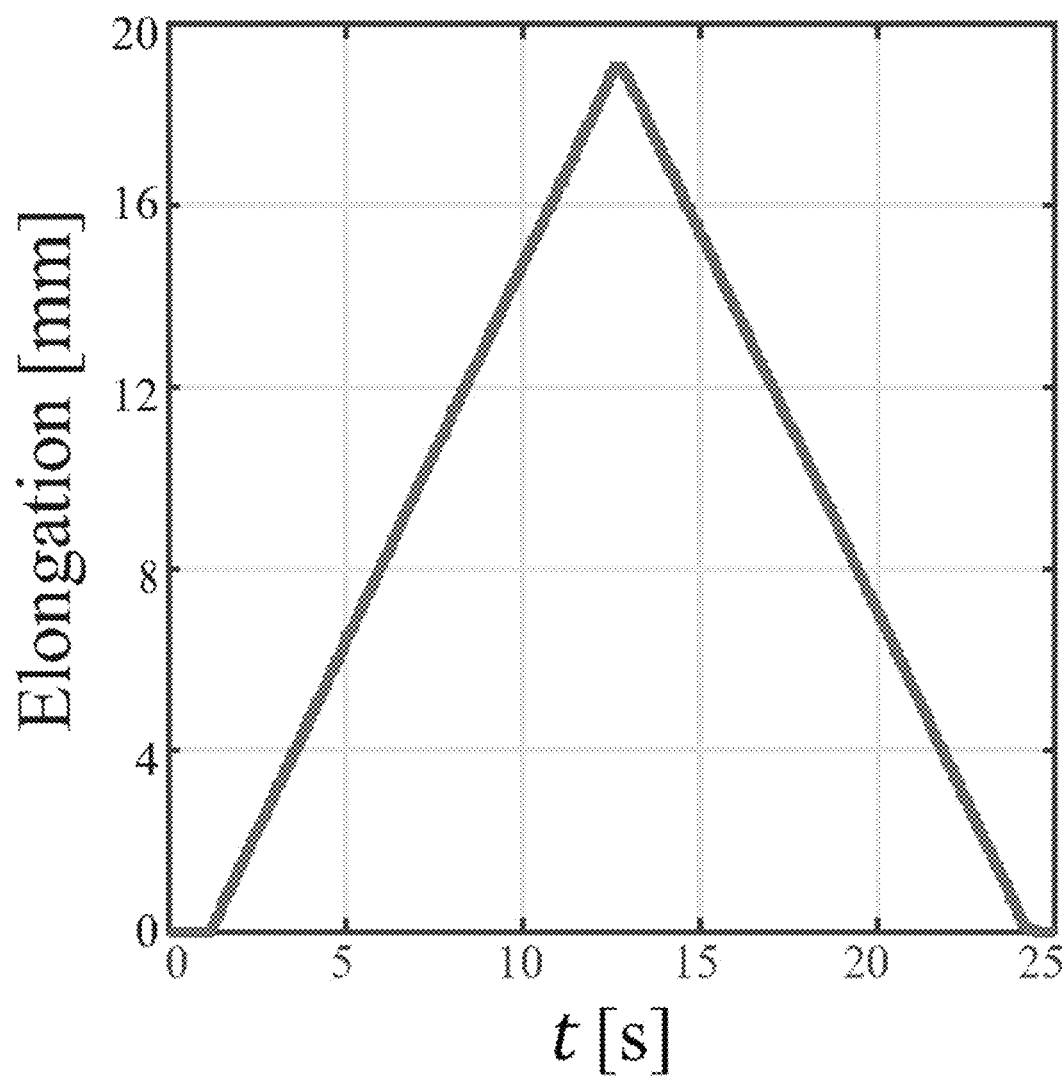
FIG. 4A is a graph showing the total elongation of a piezoelectric element obtained by image processing over time.
Figure 4B:
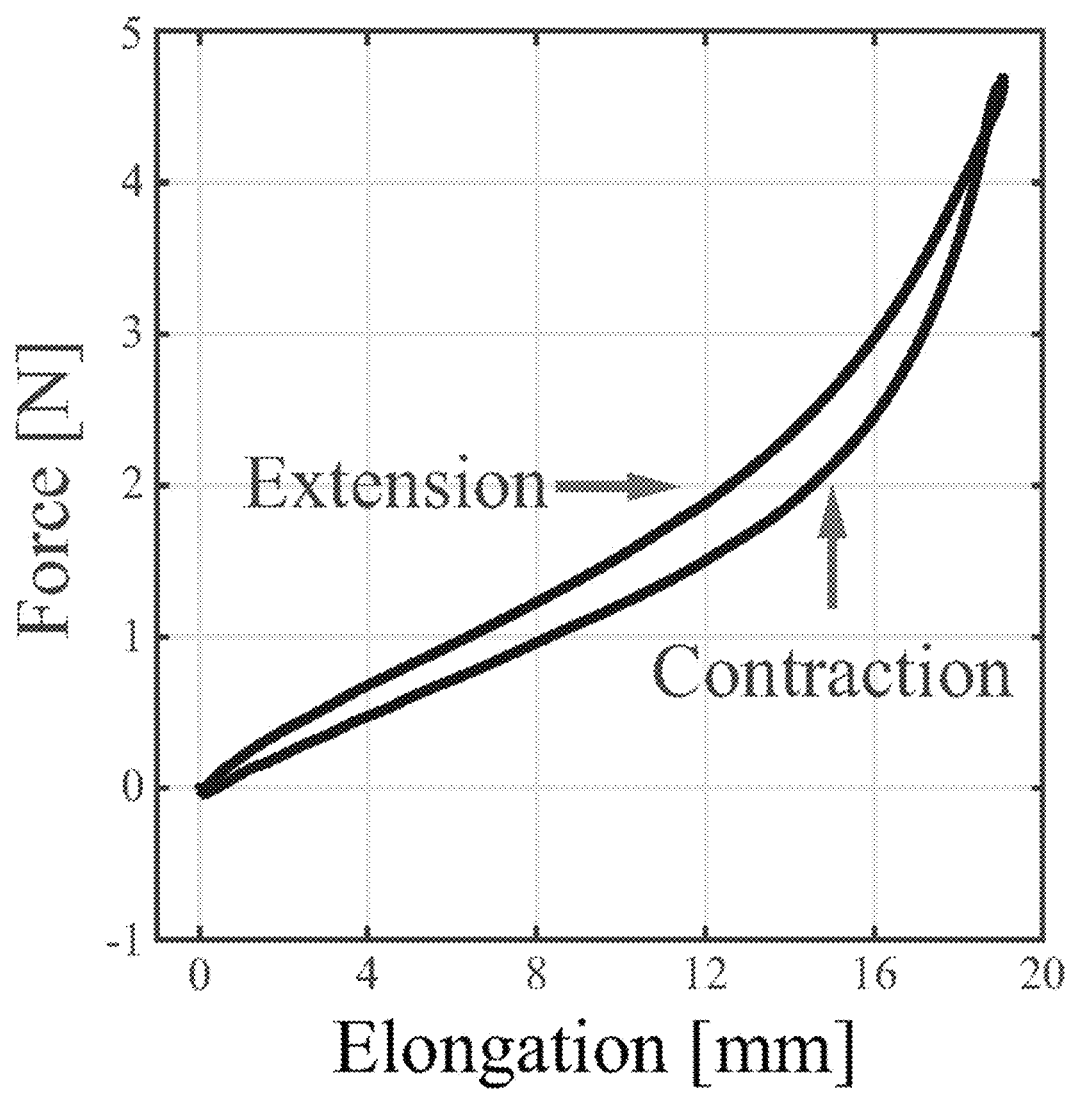
FIG. 4B is a graph showing a force as a function of elongation by a load cell.

The mechanical properties of the tendon-inspired tensile force detecting device 100 are invented according to elongation. FIG. 4 shows time tracking elongation up to 19 mm and a resulting force elongation relationship. When the tensile force detecting device 100 is stretched to 19 mm, a force of 5 N or less is transmitted to the entire structure. A rising force does not match a falling force, i.e., hysteresis. The possible origin of the hysteresis is hysteresis from the elastic thread 20.

Figure 5A:
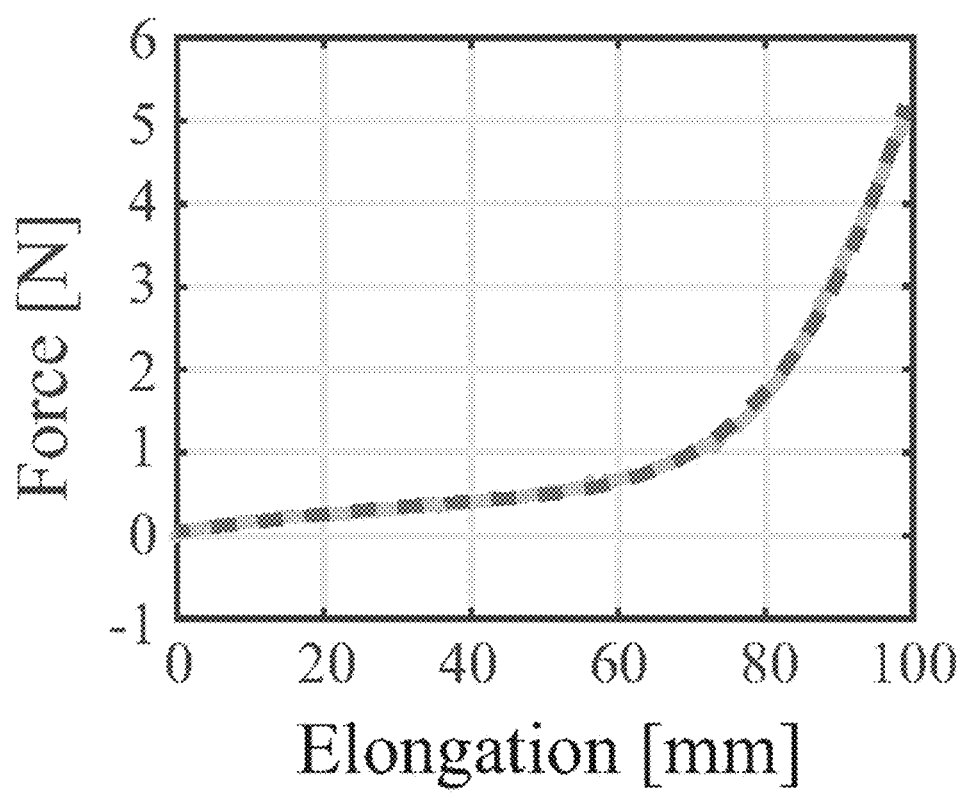
FIG. 5A is a graph showing a force as a function of elongation of an elastic thread as a result of an elasticity test.
Figure 5B:
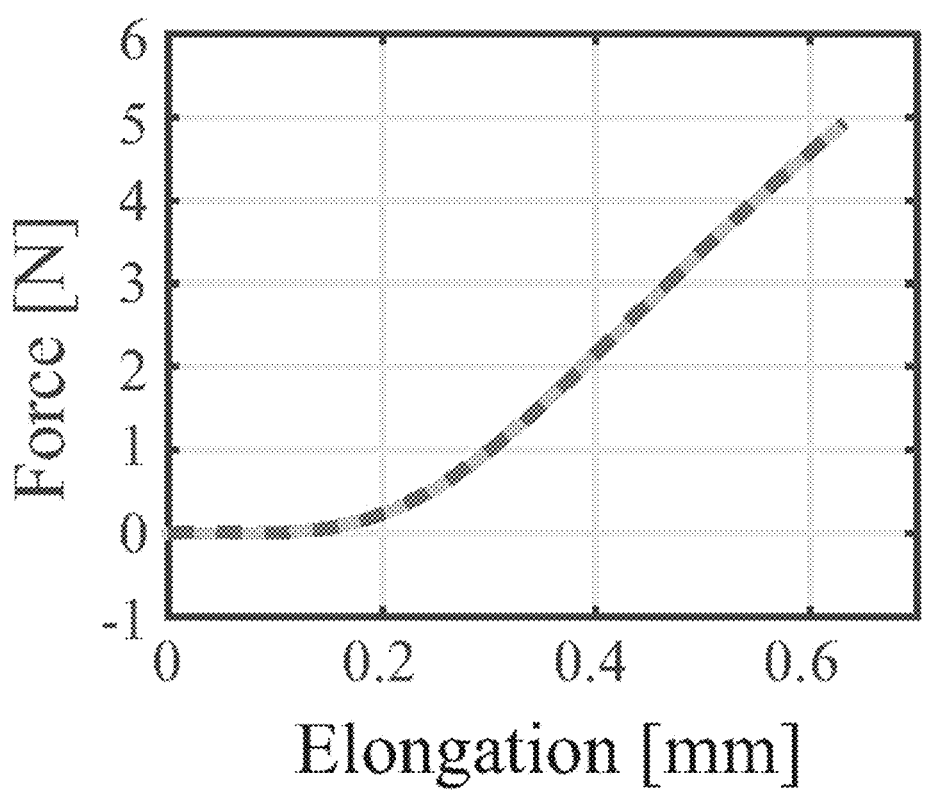
FIG. 5B is a graph showing a force as a function of elongation of a piezoelectric film as a result of an elasticity test.
Figure 5C:
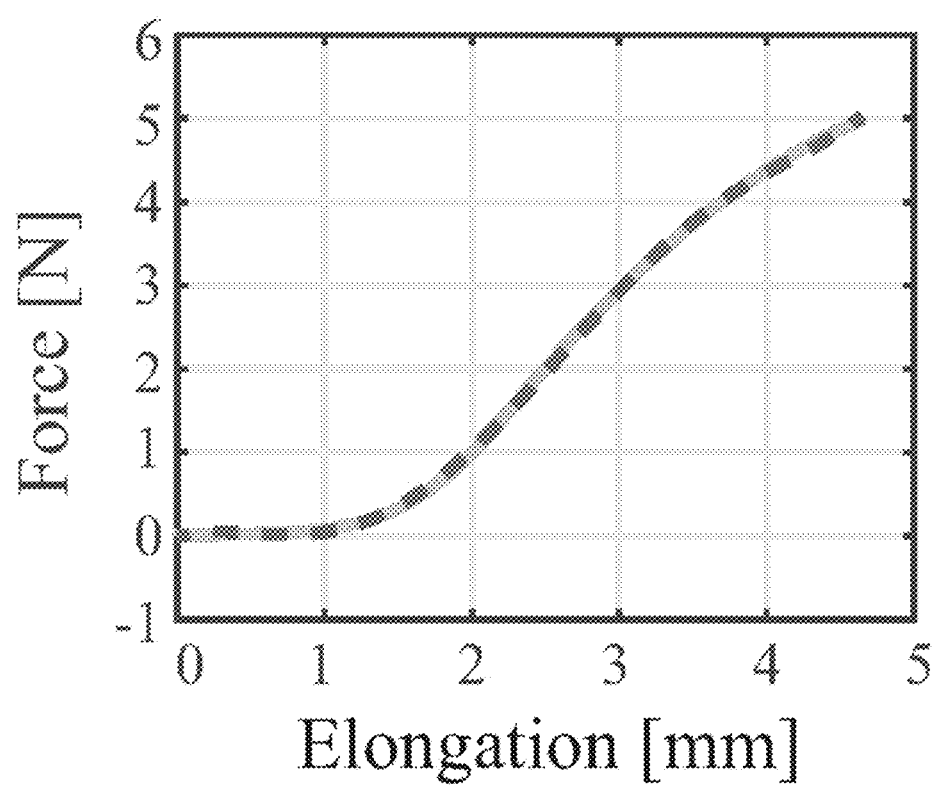
FIG. 5C is a graph showing a force as a function of elongation of a sewing thread as a result of an elasticity test.

To understand the elongation characteristics of the coupled structure including the elastic thread 20, the piezoelectric film 12 and the sewing thread 30, an additional tensile test is performed using each sensor component. The length of each material is 50 mm and the piezoelectric film 12 is fixed to a tensile jig with the width of 10 mm. FIGS. 5A to 5C show the force-elongation relationship of each component under a force of less than 5 N.

Additionally, for modeling of the Young's modulus according to elongation, polynomial fitting of the result using a fifth order polynomial is performed. A suitable result is very similar to an equivalence test having an R-square value greater than 0.9989. When the piezoelectric element 10 is stretched by the force F, the following [Equation 1] may be given by Hooke's law.

$$F = A_p Y_p E_p / L_p = A_t Y_t E_t / L_t = A_e Y_e E_e / L_e \quad \text{[Equation 1]}$$

Here, A denotes the cross section; Y denotes the Young's modulus, E denotes the elongation of the component, and L denotes the initial length. Additionally, the subscripts p, t and e denote the component parameters of the piezoelectric film 12, the sewing thread 30 and the elastic thread 20, respectively. Based on the elongation obtained by [Equation 1], the coupled elongation of each material may be expressed as below.

$$E_m = \frac{\frac{L_m}{A_m Y_m}}{\frac{L_p}{A_p Y_p} + \frac{L_t}{A_t Y_t} + \frac{L_e}{A_e Y_e}} \cdot E_S, \, m = p, t, \text{ or } e \quad \text{[Equation 2]}$$

Figure 6:
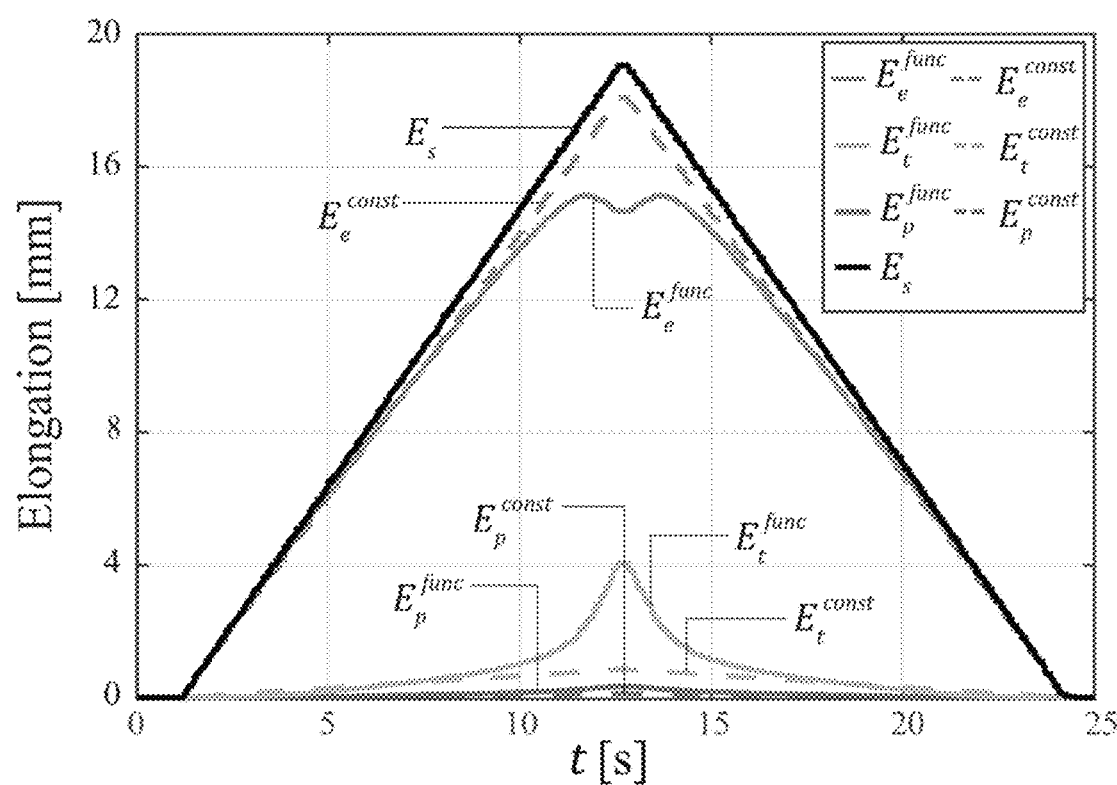
FIG. 6 is a graph showing the elongation of an elastic thread, a sewing thread and a piezoelectric element over time.

Here, $E_s$ denotes the total elongation of the tensile force detecting device 100. FIG. 6 shows the elongation obtained by [Equation 2]. In detail, each elongation of the elastic thread 20, the piezoelectric film 12 and the sewing thread 30 using functional Young's modulus is obtained by polynomial fitting. Additionally, the elongation simply calculated from the Young's modulus assumed as a constant is found using an average slope. The elongation result under the assumption that the Young's modulus is uniform shows a proportional elongation to the constant $E_s$.

On the contrary, the elongation result when Young's modulus is modeled with polynomial functions shows a nonlinear relationship according to $E_s$ in combination with the mechanical interaction of the sensing component. Additionally, an elongation difference between the two increases at high $E_s$. Elongation of the piezoelectric film 12 component is very small, but the electrical response by the coupled piezoelectric properties is affected by nonlinear elongation.

C. Electrical Response

Figure 7A:
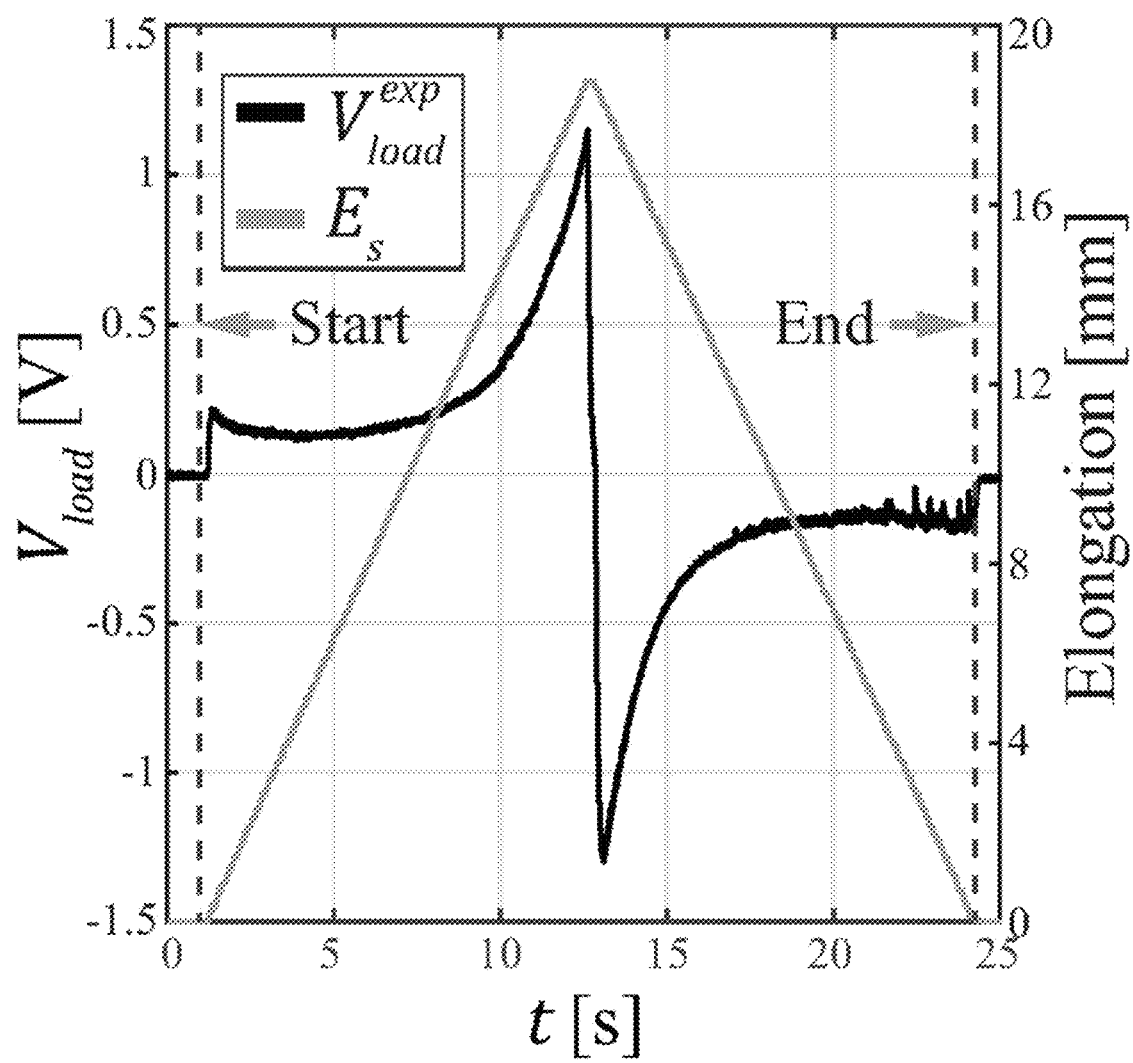
FIG. 7A is a graph showing a measured load voltage of a sensor having elongation time trajectory.

The electrical response of the tendon-inspired tensile force detecting device 100 is measured under the load resistance of 100 MΩ. FIG. 7A shows that the measured load voltage, $V^{exp}_{load}$, overlapped with the total elongation over time. To investigate a pure electrical response of the sensor with no load resistance effect, the measured load voltage $V^{exp}_{load}$ is converted into OCV $V^{exp}_{oc}$ using the following [Equation 3].

$$V^{exp}_{oc}(t_n) = \frac{1}{R_{load} C_p} \sum_{m=1}^{n} [(V^{exp}_{load}(t_m) \times \Delta t] + V^{exp}_{load}(t_n) \quad \text{[Equation 3]}$$

Here, $R_{load}$ denotes the load resistance (100 MΩ), $C_p$ denotes the capacitance (490 pF) of the sensor, $\Delta t$ denotes the time interval and $t_n$ denotes the measurement duration.

Theoretically, through the piezoelectric properties, OCV $V_{oc}^{th}$ can be expected.

$$V_{oc}^{th} = \frac{l_s b_s d_{31} \sigma_p}{C_p} = \frac{\eta t_p d_{31} \sigma_p}{\epsilon_{33}} \quad \text{[Equation 4]}$$

Figure 7B:
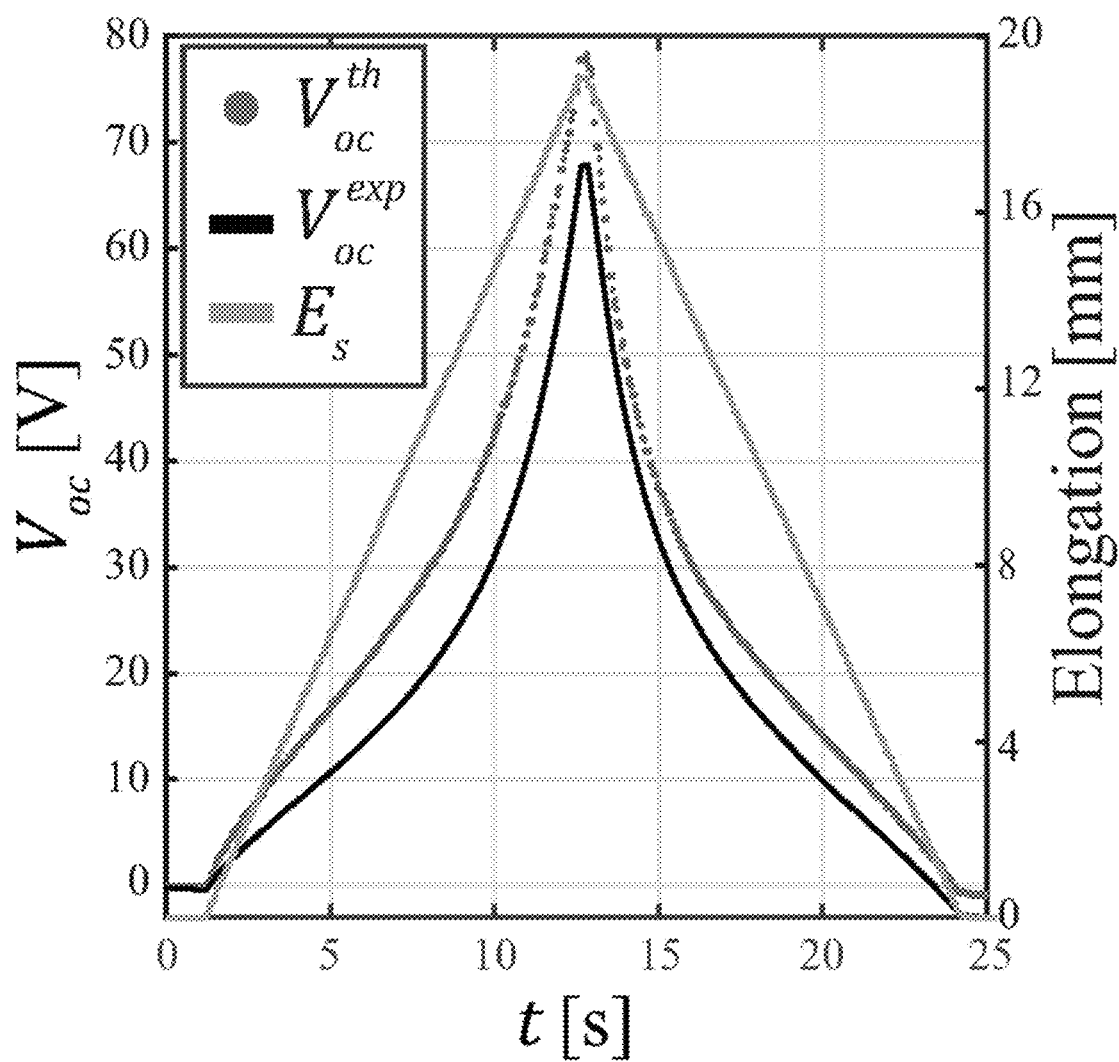
FIG. 7B is a graph showing measured and theoretical open circuit voltages (OCVs) having elongation time trajectory.
Figure 7C:
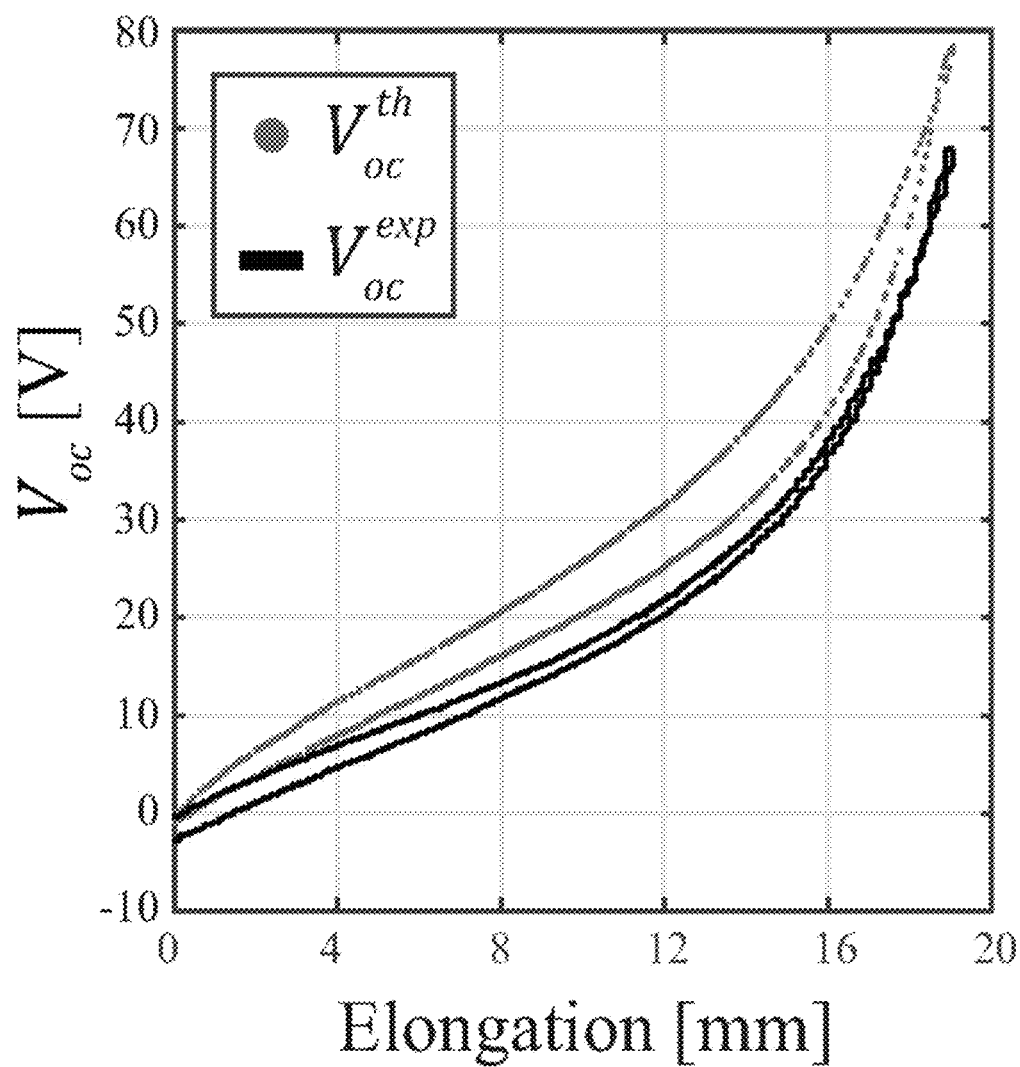
FIG. 7C is a graph showing measured and theoretical OCVs as a function of elongation of a sensor.

Here, $\sigma_p$ denotes the stress applied to the piezoelectric film 12 layer, $l_s$ denotes the length of the sensing area, $b_s$ denotes the width of the sensing area, $t_p$ denotes the thickness, $d_{31}$ denotes the piezoelectric coefficient, $\epsilon_{33}$ denotes the dielectric constant, and η denotes a ratio of the length of the sensing area to the length of the entire piezoelectric layer. In detail, the parameter values are as follows, $\sigma_p = F/A_p$, $l_s = 10$ mm, $b_s = 5$ mm, $t_p = 28$ μm, $d_{31} = 23 \times 10^{-11}$ C/N, $\epsilon_{33} = 1.09 \times 10^{-10}$ F/m, and η=0.4. FIGS. 7B and 7C show $V^{exp}_{oc}$ and $V^{th}_{oc}$ as a function of time and elongation respectively.

Here, $V^{exp}_{oc}$ and $V^{th}_{oc}$ have similar tendencies, and show a nonlinear relationship with the total elongation due to the coupled mechanical elasticity of the sensing components. Additionally, $V^{th}_{oc}$ has a larger value than the magnitude of $V^{exp}_{oc}$. The possible cause of mismatch may be lower due to a difference in the real detection area 19b length and the fabrication process, causing lower η. Additionally, an error may occur due to a force transmission loss in the connection between the components.

Figure 7D:
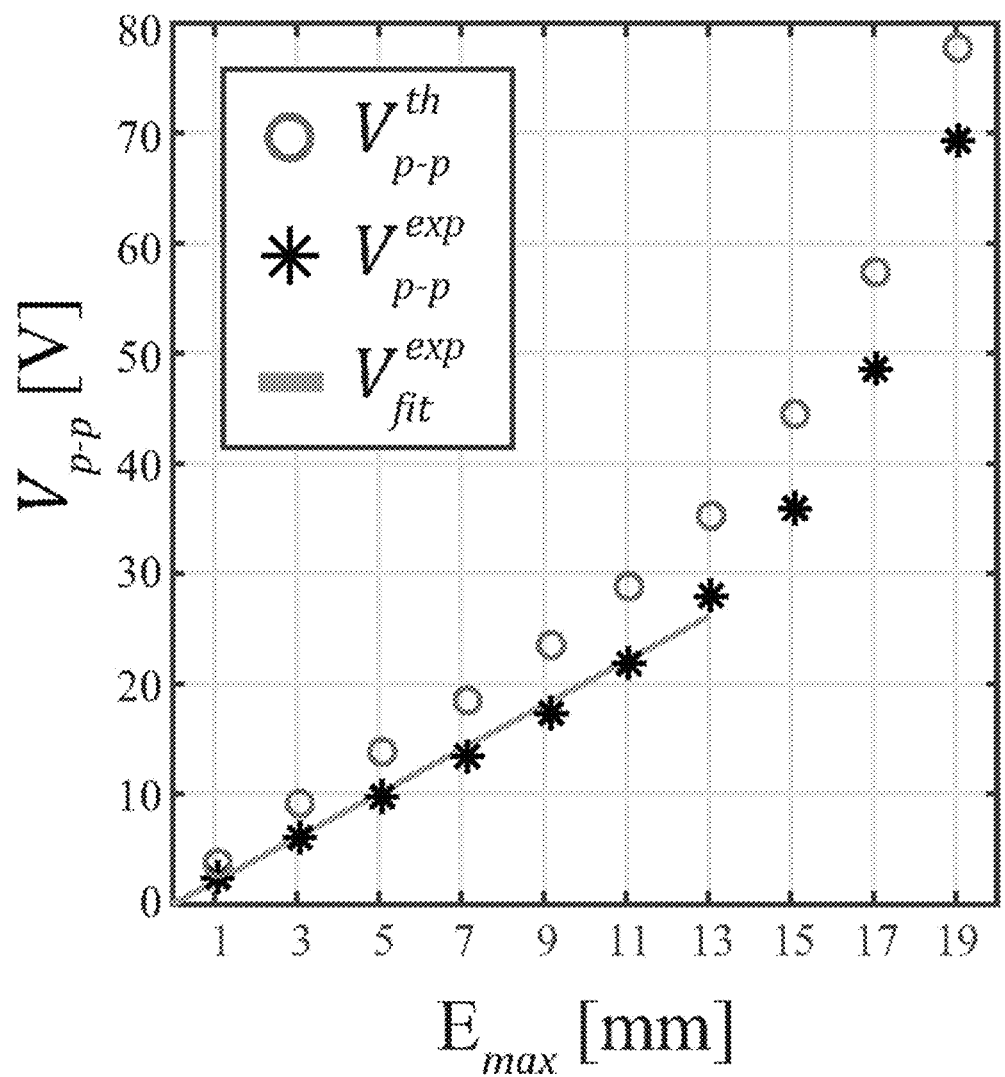
FIG. 7D is a graph showing measured and theoretical peak-to-peak OCV amplitude as a function of maximum elongation trajectory of a sensor.

Additionally, the peak-to-peak OCV amplitude is extracted according to each elongation as shown in FIG. 7D. The theoretical prediction matches the test result that expects a peak value well. At the elongation of 19 mm, a difference between the theoretical value and the test value is about 10%. Accordingly, a theoretical model is useful in predicting the electrical response of the tendon-inspired tensile force detecting device 100.

Additionally, to verify the linearity of the electrical response of the sensor, the test peak-peak voltage amplitude is fit by a linear equation passing through the origin of the maximum elongation $E_{max}$. In overall fitting, linearity according to elongation has a relatively low R-square value of 0.8539. However, until the tensile elongation of less than 13 mm is reached, the test voltage amplitude has the R-square value of 0.994, showing high linearity.

Hereinafter, an example of biometric application of the tensile force detecting device 100 of the present disclosure is described.

Figure 9:
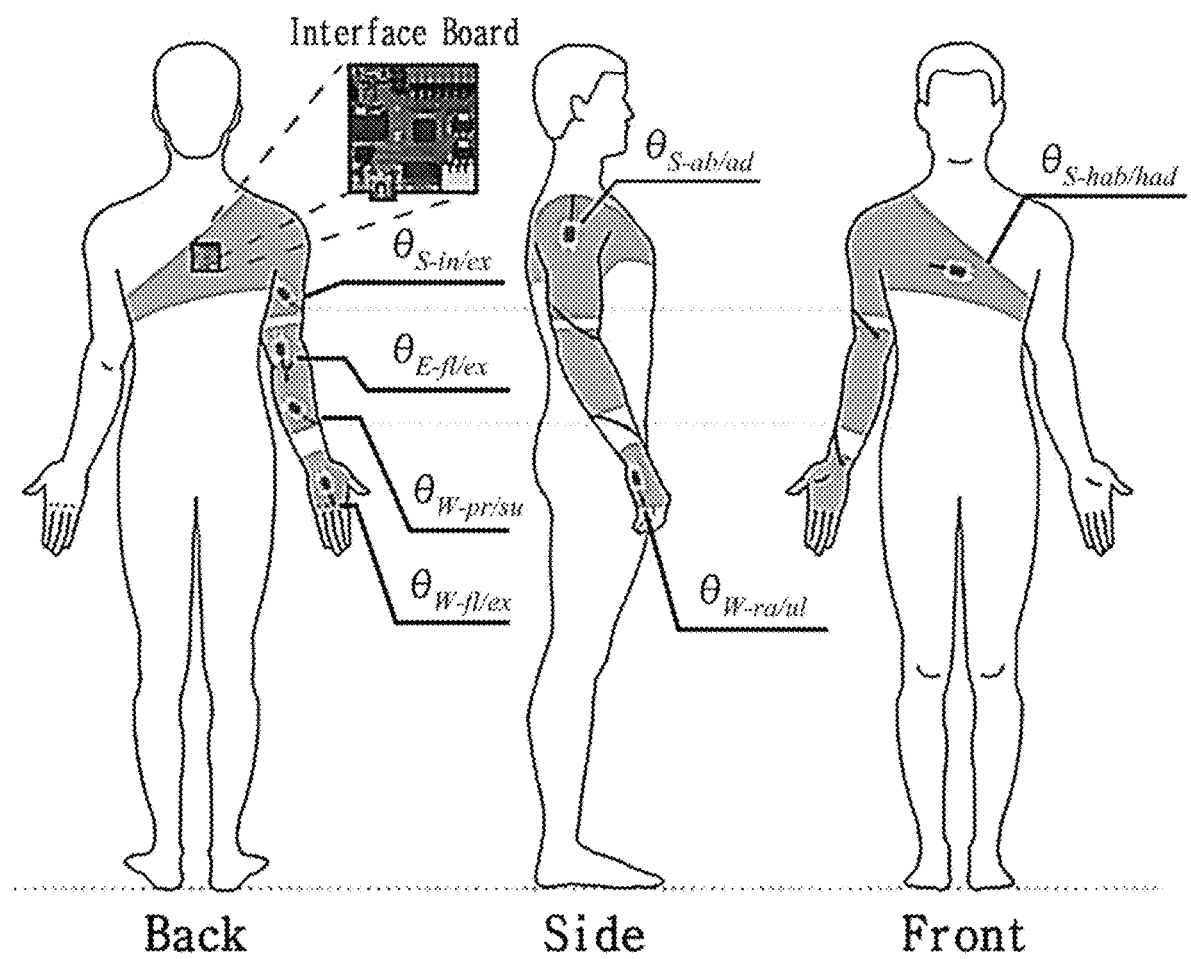
FIG. 9 is a conceptual view showing a tensile force detecting device of the present disclosure applied to a wearable motion sensing device.
Figure 10A:
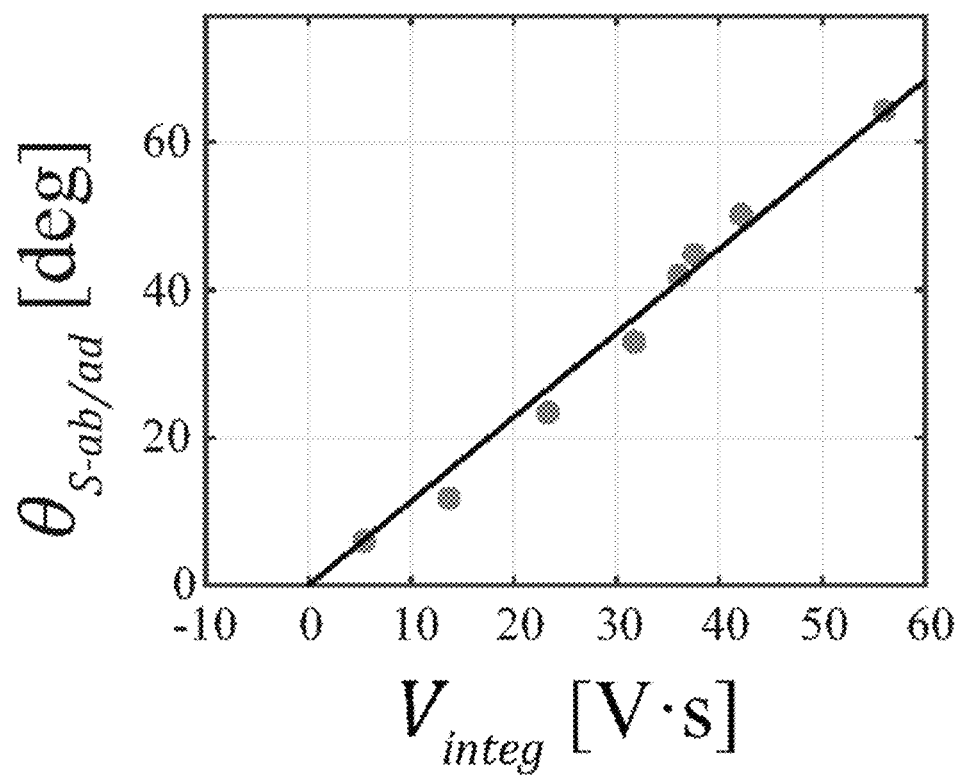
FIGS. 10A to 10G are graphs showing the amplitude of reference angle to the amplitude of integrated voltage.
Figure 10B:
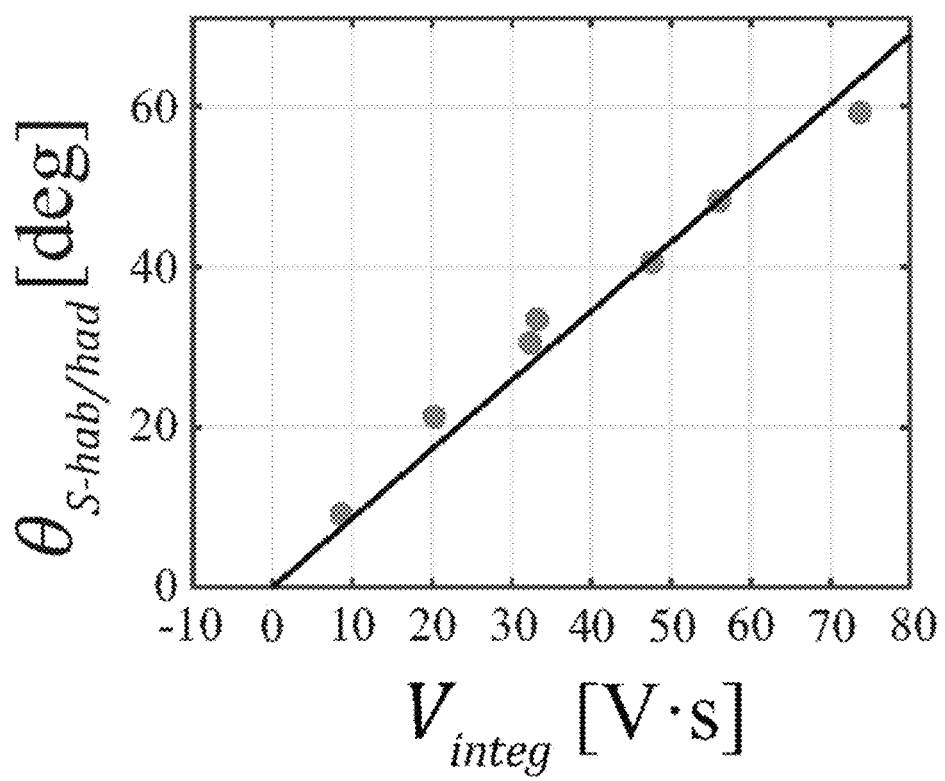
Figure 10C:
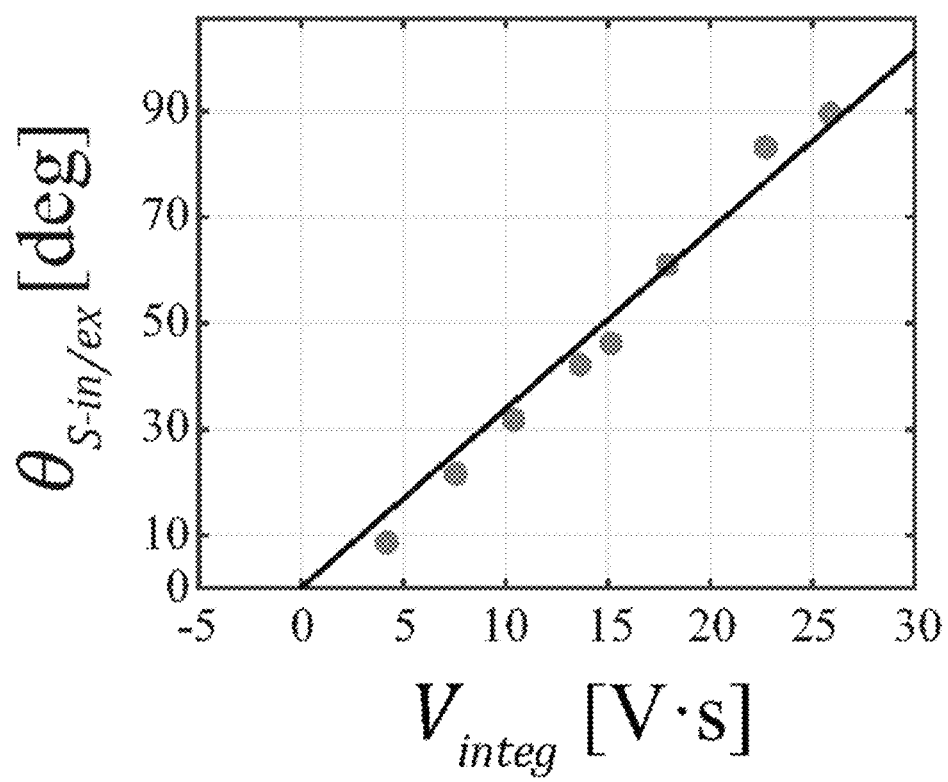
Figure 10D:
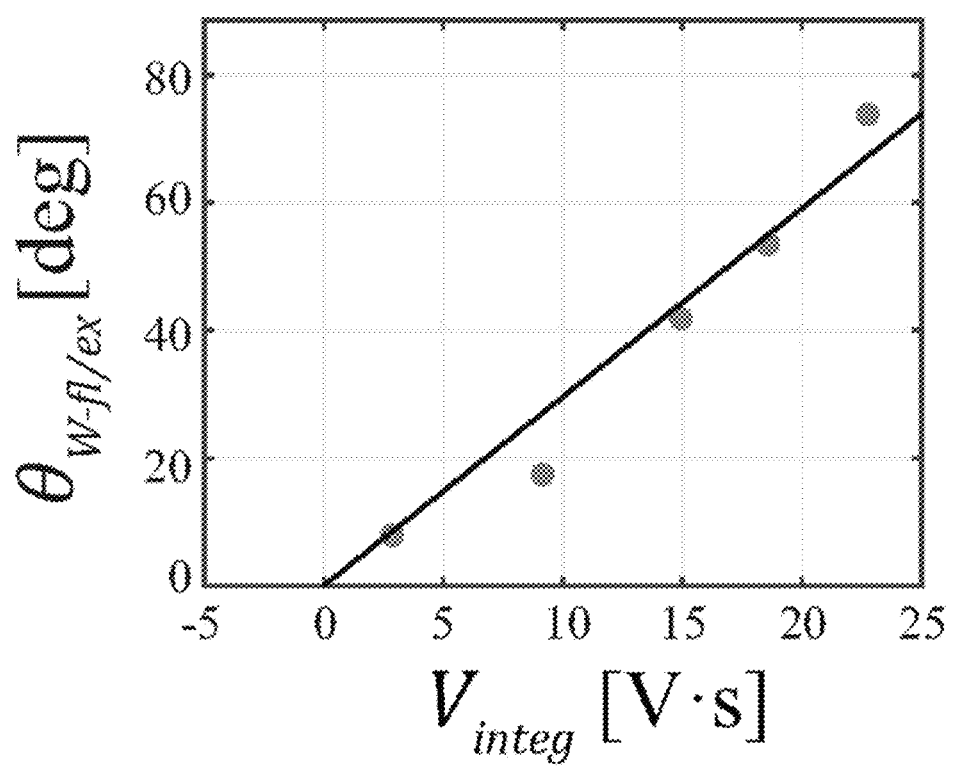
Figure 10E:
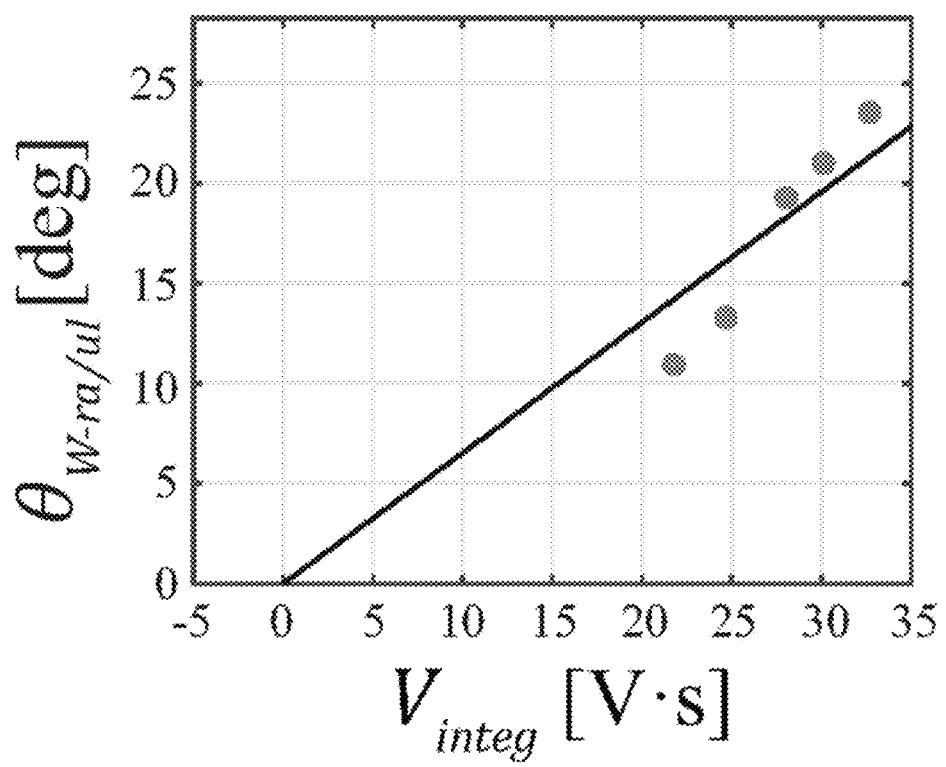
Figure 10F:
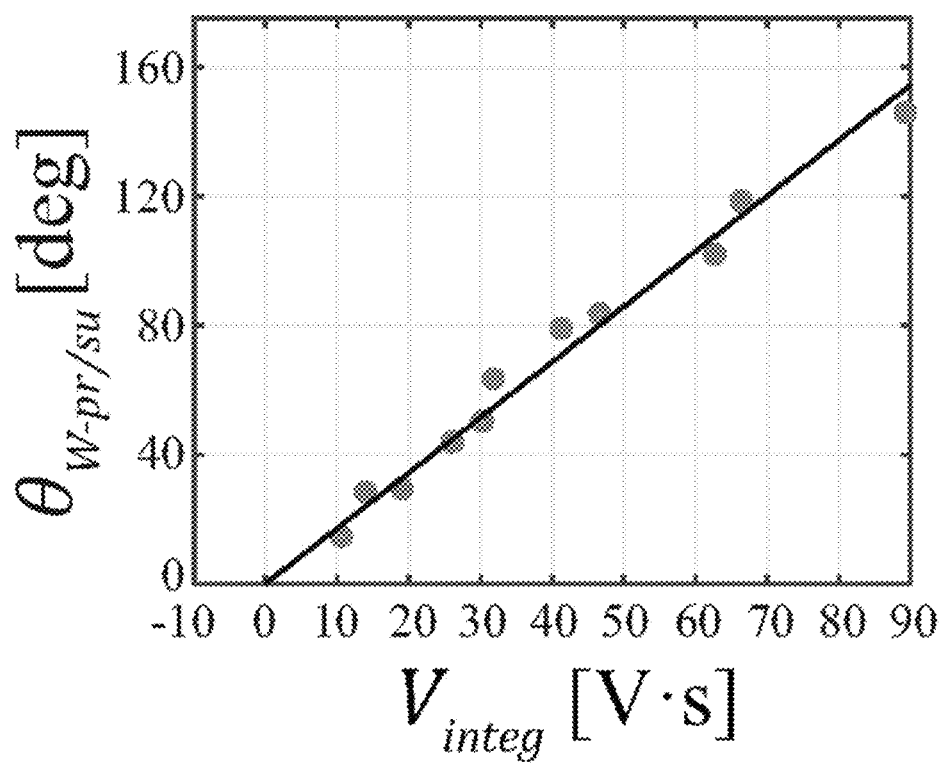
Figure 10G:
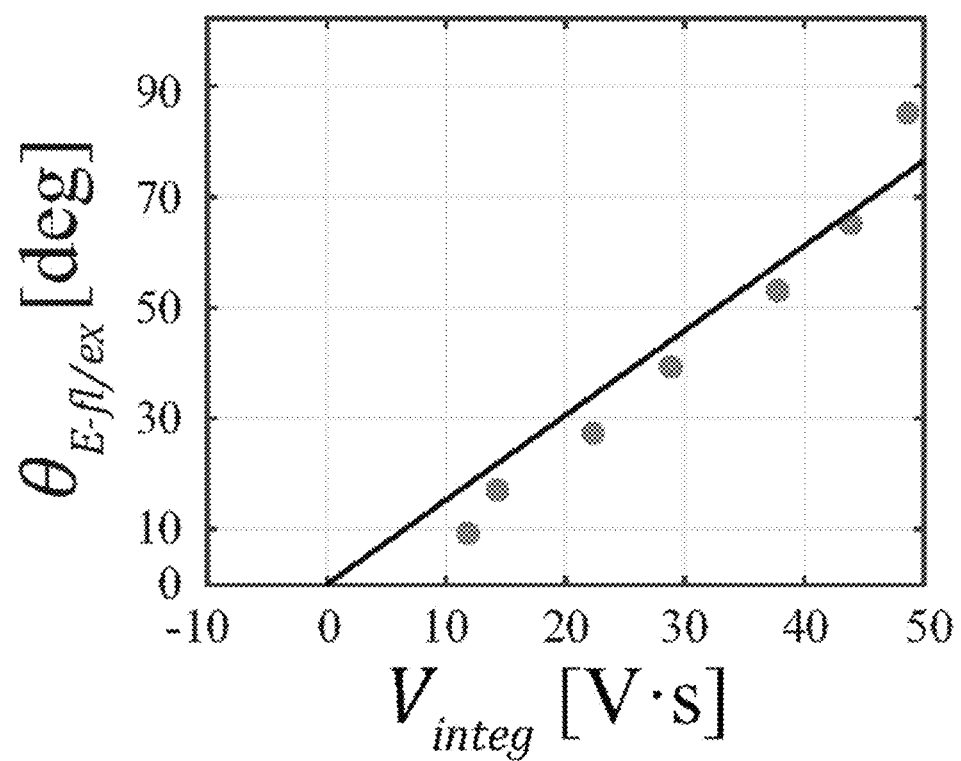
Figure 11A:
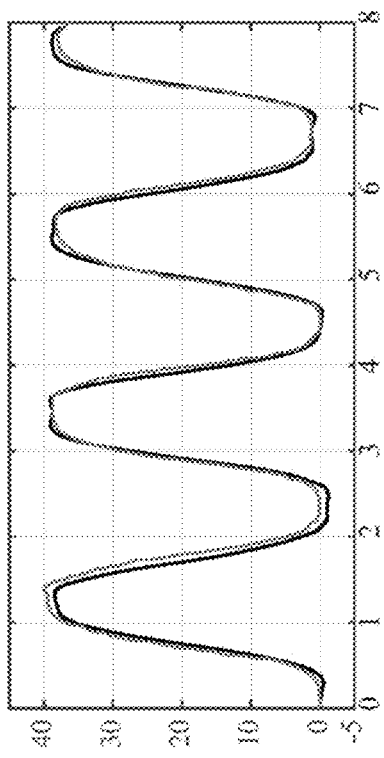
FIGS. 11A-1 to 11G-2 are graphs showing typical time tracking of voltage output and an estimated angle overlapping a reference angle.
Figure 1:
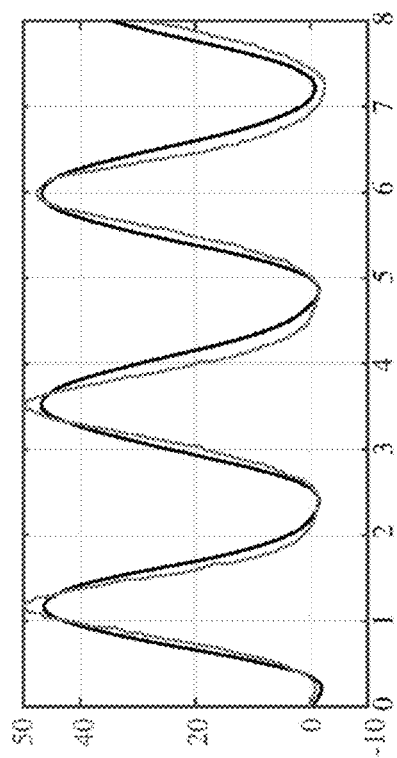
Figure 2:
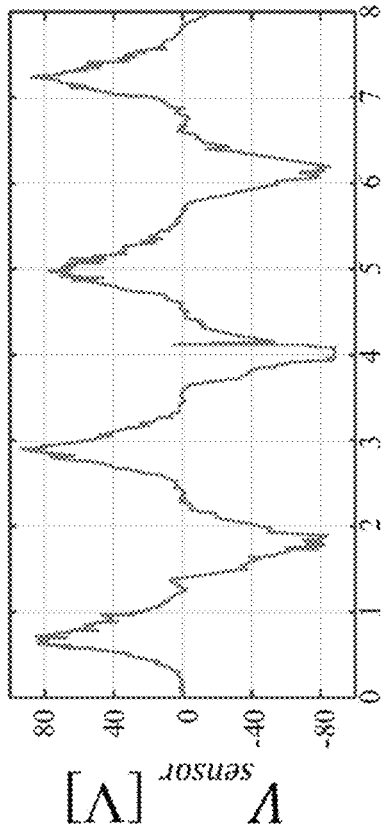
Figure 11B:
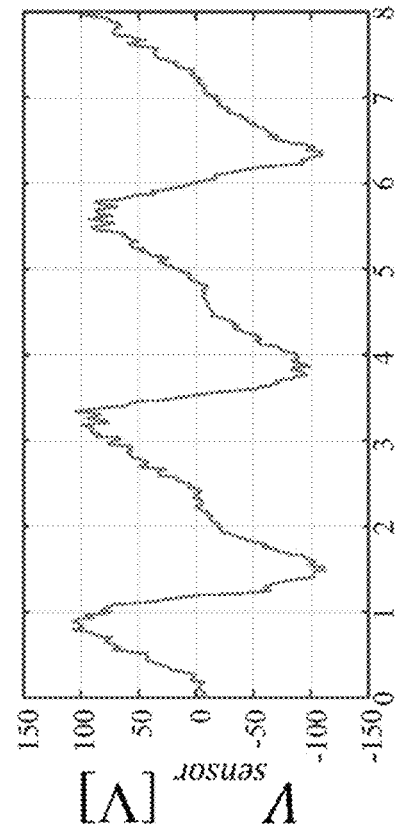
Figures 1, 11C:
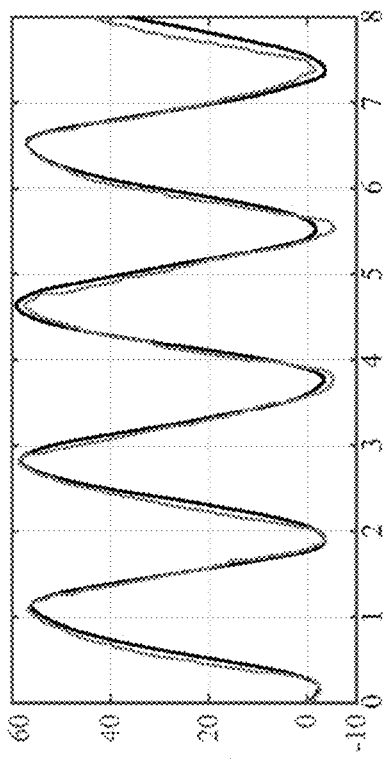
Figures 2, 11C:
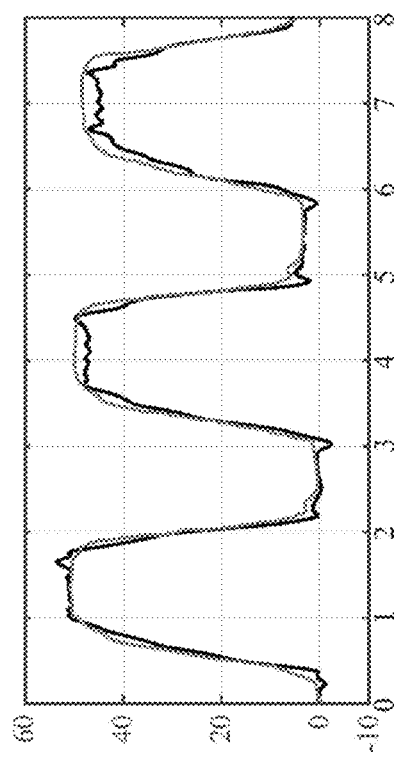
Figures 1, 11D:
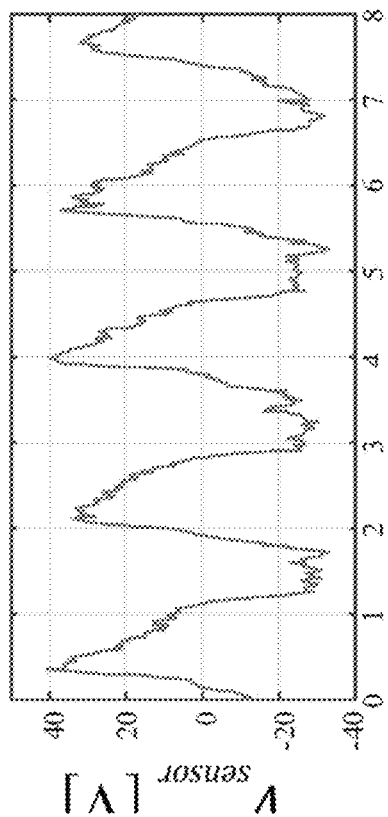
Figures 2, 11D:
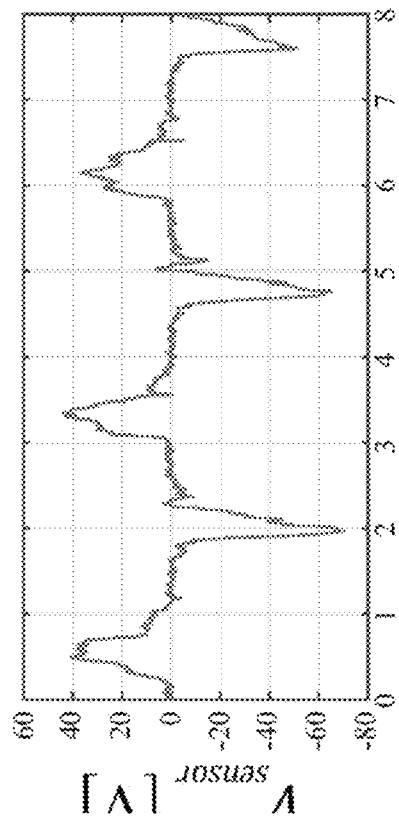
Figures 1, 11E:
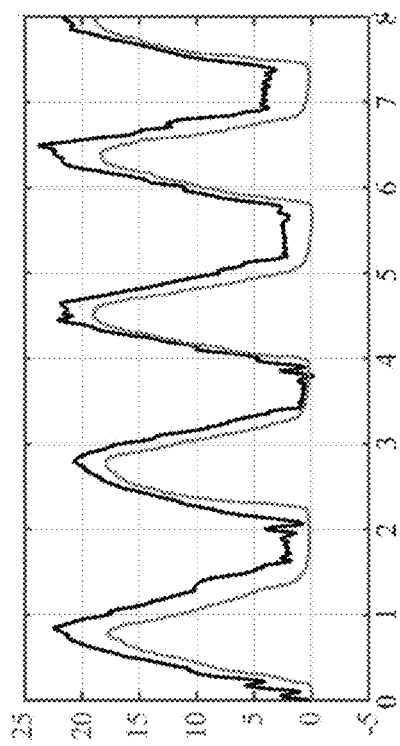
Figures 1, 11F:
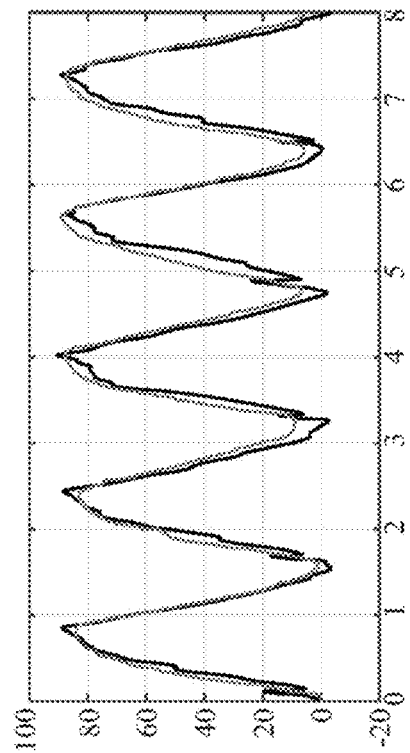
Figures 2, 11E:
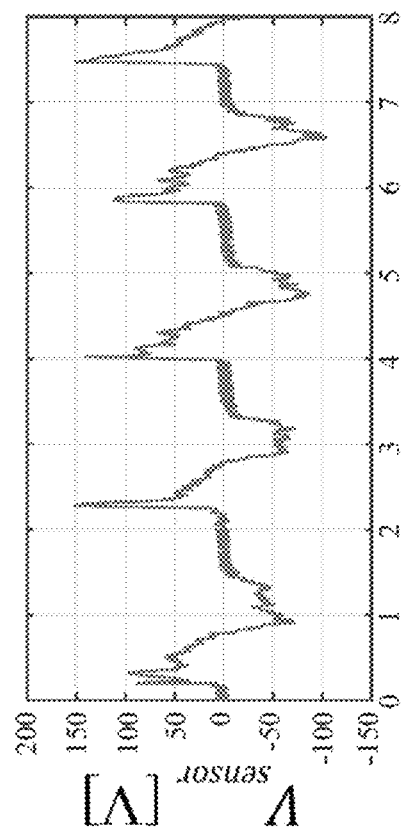
Figures 2, 11F:
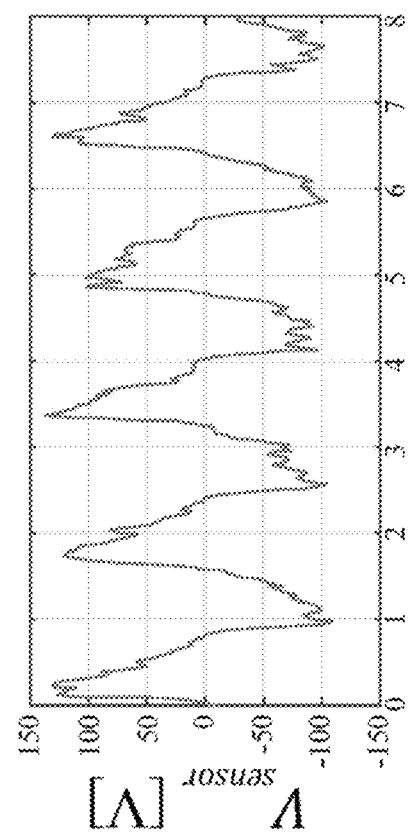
Figures 2, 11G:
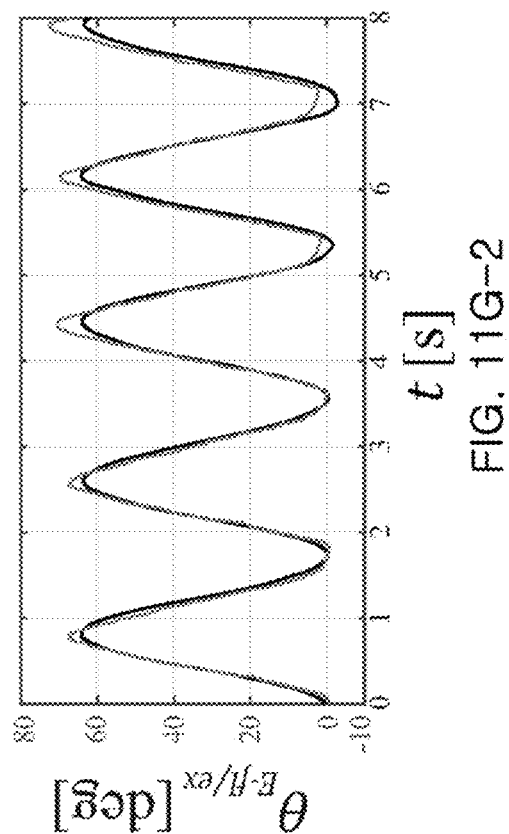
Figures 1, 11G:
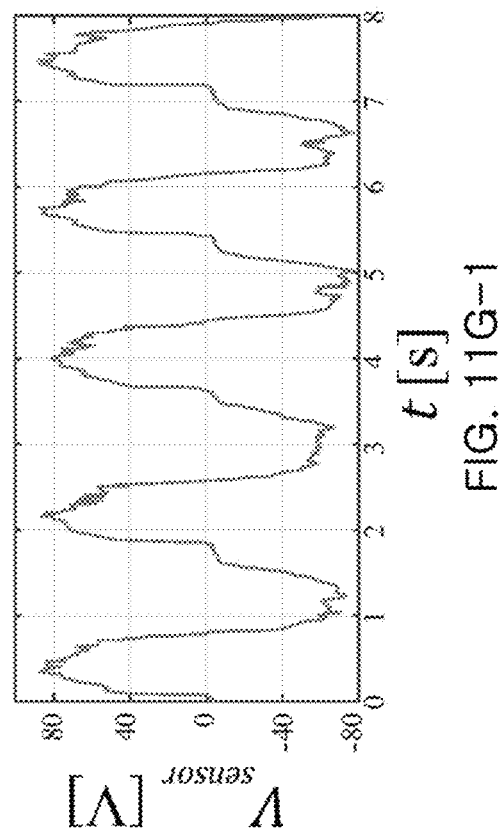

An upper limb movement sensing system using the tensile force detecting device 100 of the present disclosure is tested using the tensile force detecting device 100 inspired by seven tendons using a shoulder protector, an elbow protector and a wrist protector available on the market. As can be seen from FIGS. 8 and 9, seven sensors are attached to each joint of the upper limb of the subject.

Figure 2A:
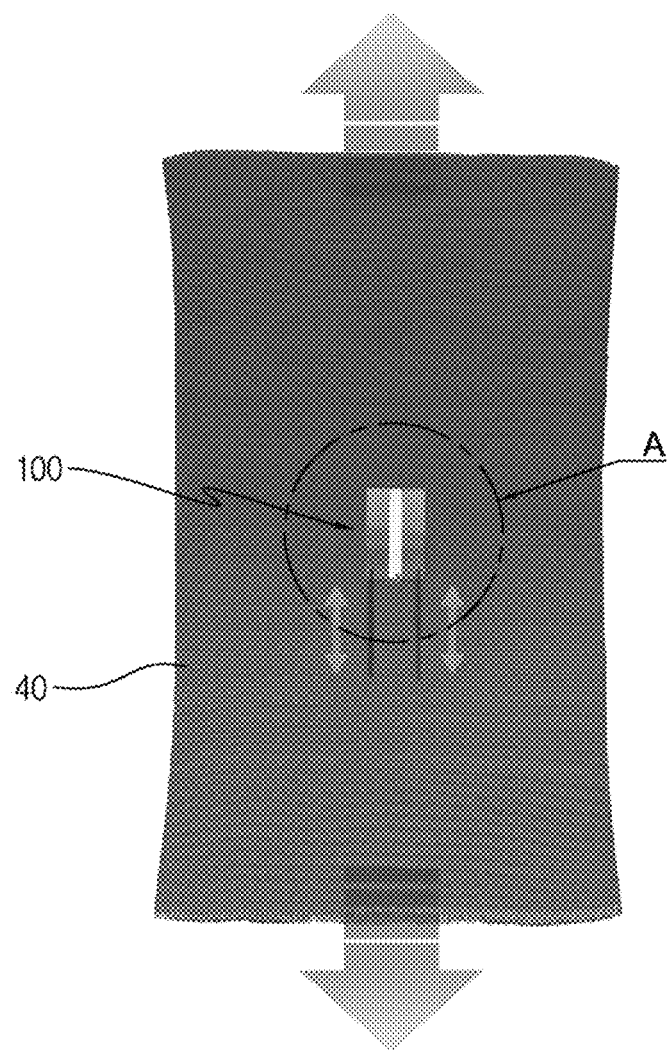
FIG. 2A is a conceptual view showing an example of a load applied to a tensile force detecting device of the present disclosure.
Figure 2B:
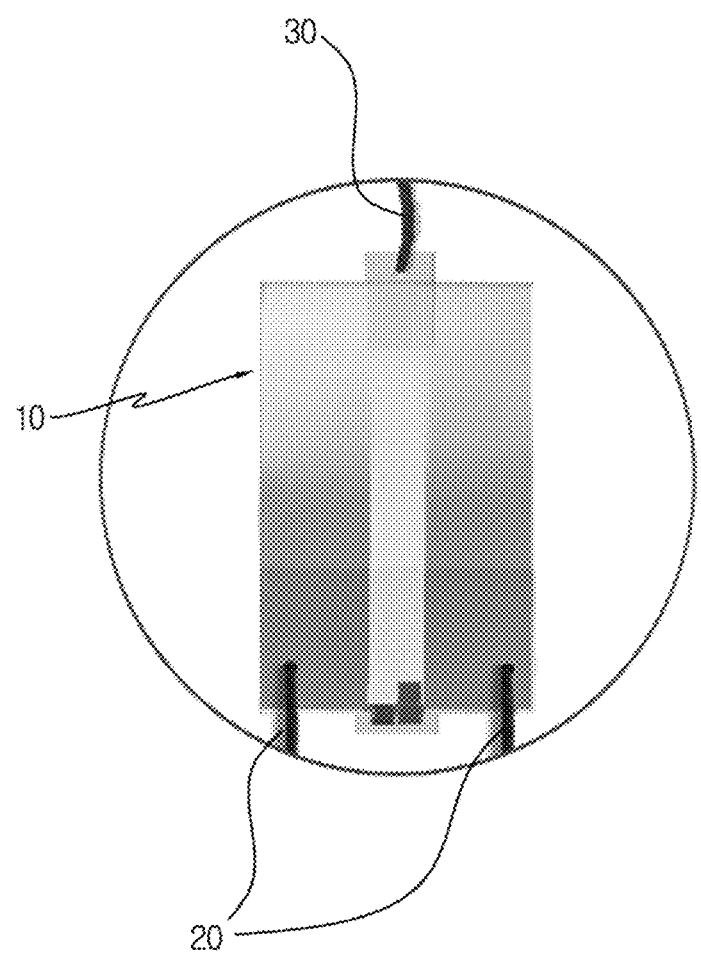
FIG. 2B is an enlarged view of section A in FIG. 2A.

Additionally, referring to FIGS. 2A and 2B, an example of the tensile force detecting device 100 of the present disclosure installed in a wearable element 40 is shown.

Referring to a glove system, three sensors disposed at the joints $\theta_{S\text{-}ab/ad}$, $\theta_{S\text{-}hab/had}$ and $\theta_{S\text{-}in/ex}$ are mounted on the basis of the time when shoulder joints of the subject are disposed.

Additionally, the three sensors disposed at $\theta_{W\text{-}fl/ex}$, $\theta_{W\text{-}ra/ul}$ and $\theta_{W\text{-}pr/su}$ are connected at the time of extension, ulnar deviation and maximal flexion of the wrist of the subject. Finally, $\theta_{E\text{-}fl/ex}$ is measured at the time of maximal elbow flexion of the subject. There is a sensing limitation due to the pressure and buckling effect of the motion sensing suite.

In the earlier inventions, an interface board having the load resistance of 10 MΩ is used. The sensing output measured by the interface board is transmitted to a PC through Bluetooth transmission at the sampling frequency of 100 Hz and processed through C++ program of the PC.

Additionally, VIVE tracker (HTC Co., Ltd.) is used to obtain the reference angle. The tracker is attached to each joint of the subject. The subject repeats periodic movements at each axis and the 3D coordinates of the VIVE tracker are simultaneously recorded. The recorded 3D coordinates are converted into the reference angle through MATLAB.

B. Data Processing and Correction

As pre-processing of the detection output of the tendon-inspired tensile force detecting device 100, sine fitting is performed on the reference angle to obtain the fundamental frequency of the periodic movement of the subject. The subject repeats periodic movements at the frequency between 0.3 Hz and 1.2 Hz. In the given frequency range, the load resistance is 25 to 100 times lower than the internal impedance of the piezoelectric film 12 layer. In this case, the output voltage of the piezoelectric element 10 is proportional to the change in strain applied to the piezoelectric film 12 layer. Accordingly, referring to [Equation 5], the joint angle is obtained by integrating the measured sensor voltage.

$$\theta_{sensor}(t_n) = \zeta \sum_{m=1}^{n} [(V_{sensor}(t_m) - O(t_m)) \times \Delta t_m] \quad \text{[Equation 5]}$$

Here, $\theta_{sensor}$ denotes the angle converted from $V_{sensor}$, $\zeta$ denotes the gain, $V_{sensor}$ denotes the voltage output of the piezoelectric element 10, $\Delta t_m$ denotes the time internal and O denotes the offset value.

To determine $\zeta$, the amplitude of the integrated sensing voltage is compared with the amplitude of the reference angle as shown in FIGS. 10A to 10G.

In detail, the amplitude of the reference angle to the integrated sensing voltage is fitted as a linear function passing through the origin.

The R-square value and coupling coefficient for each angle are shown in FIGS. 10A to 10G. When a uniform gain is introduced, the angle at which the subject moves along each axis accurately corresponds to the sensor output. Additionally, motion sensing may detect daily life activities, for example, door opening or hands shaking. However, $\theta_{W\text{-}ra/ul}$ has the lowest $\zeta$ and poor performance. $\theta_{W\text{-}ra/ul}$ has a limited range of motion due to extreme buckling effect and lack of space to place the sensor.

Based on the gain obtained from linear fitting, FIGS. 11A-1 to 11G-2 show the typical voltage output and the processed angle overlapping the reference angle.

The results show that the system can precisely sense the upper limb movements having seven degrees of freedom through the tensile force detecting device 100 inspired by seven tendons.

C. Real-Time Motion Sensing

For real application of the tendon-inspired tensile force detecting device 100, a real-time motion sensing system using the above-described data processing and correction is presented. The processed angle of the tensile force detecting device 100 inspired by each tendon to visualize the motion sensing is transmitted to each joint angle of the virtual avatar. In particular, the joint angle is processed and reflected on the virtual avatar in real time using C++ program of PC.

FIGS. 12A to 12I show captured images of a 3D avatar visualization video. The initial pose of the subject and the 3D avatar is shown in FIGS. 12A and 12F. Then, the subject makes subsequent movements at a normal movement speed from FIG. 12A to FIG. 12E, and from FIG. 12F to FIG. 12I. The subject and the 3D avatar show high synchronization in each motion.

The present disclosure proposes the tendon-inspired tensile force detecting device 100 as a sensing platform for biological recognition application.

In particular, the proposed structure is biologically inspired by the anatomical structure of tendons. Additionally, the proposed piezoelectric sensor glides with resistance to the tensile load by coupling of the elastic thread 20, the sewing thread 30 and the piezoelectric film 12, making the structure very suitable for a wide range of situations.

Meanwhile, as described above, to identify the mechanical properties of the tendon-inspired tensile force detecting device 100, test setup is made to apply a tensile load to the piezoelectric element 10 and the corresponding component. Since the tensile force detecting device 100 is simplified by mechanical joining of the elastic thread 20, the piezoelectric film 12 and the sewing thread 30, theoretically, elongation of each component based on the total elongation is expected when using the Young's modulus of each sensing component. The elongation of each component shows nonlinear properties due to the coupled mechanical interaction.

Additionally, the voltage output of the tendon-inspired tensile force detecting device 100 is measured along the total elongation. As a result, theoretical expectation of sensing output is derived using the piezoelectric properties. The theoretical and test sensing outputs show similar tendencies and match well.

Additionally, it is found that the sensing response can be represented by a linear function in a specific range of elongation.

Finally, the real-time motion sensing system is tested using a body support having the tensile force detecting device 100 inspired by seven tendons. In detail, the sensor is attached to each joint of the upper limb of the subject. The sensing output is processed and fitted by an unbiased linear function according to the reference angle. Based on the corrected sensing output, the upper limb movement having seven degrees of freedom is visualized through the well-synchronized virtual avatar. The validity of the sensing system using the tendon-inspired tensile force detecting device 100 is proved.

The tensile force detecting device 100 of the present disclosure can be used as sensing mechanism, and because of flexibility, lightweight and compatibility advantages, the tensile force detecting device 100 can be used in a wide range of applications.

The tensile force detecting device of the present disclosure may detect a wide range of tensile loads, free of tensile fatigue behavior.

Additionally, the tensile force detecting device of the present disclosure in combination with the sewing thread is very suitable in difficult environments for sensors such as small joints in the human body to be applied.

The tensile force detecting device of the present disclosure may emulate the fibrous elastic structure of tendons, thereby detecting a wide range of tensile loads, free of tensile fatigue behavior.

The tensile force detecting device 100 as described above is not limited to the configuration and method of the embodiments described above, and some or all the embodiments may be selectively combined to make various modifications.

It is obvious to those skilled in the art that the present disclosure may be embodied in other particular forms without departing from the spirit and essential features of the present disclosure. Therefore, the above detailed description should not be interpreted as being limiting in all aspects and should be considered as being exemplary. The scope of the present disclosure should be determined by the reasonable interpretation of the appended claims, and the scope of the present disclosure covers all modifications within the equivalent scope of the present disclosure.

What is claimed is:

1. A tensile force detecting device with elastic elements, comprising:
    a piezoelectric element to generate an electrical signal by a tensile load;
    an elastic thread connected to one side of the piezoelectric element to support the tensile load applied to the piezoelectric element; and
    a sewing thread connected to another side of the piezoelectric element to transmit the tensile load to the piezoelectric element.

2. The tensile force detecting device with elastic elements according to claim 1, wherein the piezoelectric element includes:
    a piezoelectric film of polyvinylidene fluoride; and
    a substrate electrode connected to the piezoelectric film.

3. The tensile force detecting device with elastic elements according to claim 2, wherein the substrate electrode is attached to one end of the piezoelectric film by an adhesive tape.

4. The tensile force detecting device with elastic elements according to claim 2, wherein the piezoelectric element further includes:
    a polyethylene terephthalate (PET) substrate disposed in contact with the piezoelectric film;
    a first PET part disposed on one end of the piezoelectric film having the attached substrate electrode to transmit the load to the piezoelectric film; and
    a second PET part disposed on another end of the piezoelectric film to transmit the load to the piezoelectric film.

5. The tensile force detecting device with elastic elements according to claim 4, wherein a fixed area is an area in which the piezoelectric film is coupled to the PET substrate by the first PET part, a tensile force applied area is an area in which the second PET part is attached to the piezoelectric film, and a detection area is between the fixed area and the tensile force applied area.

6. The tensile force detecting device with elastic elements according to claim 5, wherein the fixed area has an elastic hole that passes through the PET substrate to install the elastic thread.

7. The tensile force detecting device with elastic elements according to claim 5, wherein the tensile force applied area has a connection hole that passes through the piezoelectric film and the second PET part to install the sewing thread.

8. The tensile force detecting device with elastic elements according to claim 1, wherein the tensile load corresponds to an amount of stretching or elongation of the piezoelectric element.

9. The tensile force detecting device with elastic elements according to claim 1, further comprising:
    a PET substrate;
    wherein
    the at least one elastic thread includes two elastic threads;
    the piezoelectric element includes
        a piezoelectric film disposed on an upper surface of the PET substrate, and
        a PET part disposed on the upper surface of the piezoelectric film at an end of the piezoelectric film;
    a first hole is formed in the PET part on a first side of the piezoelectric film, and a second hole is formed in the PET part on a second side of the piezoelectric film; and
    the first hole and the second hole engage the two elastic threads respectively.

10. A tensile force detecting device with elastic elements, comprising:
    a piezoelectric element to generate an electrical signal by a tensile load;
    an elastic thread connected to the piezoelectric element to support the tensile load applied to the piezoelectric element;
    a sewing thread connected to the piezoelectric element to transmit the tensile load to the piezoelectric element; and
    a PET substrate;
    wherein the piezoelectric element includes a piezoelectric film of polyvinylidene fluoride disposed on an upper surface of the PET substrate, the piezoelectric film being narrower in a plan view than the PET substrate; and
    a first PET part disposed on an upper surface of the piezoelectric film at one end of the piezoelectric film and a second PET part disposed on the upper surface of the piezoelectric film at another end of the piezoelectric film;
    a first adhesive tape part extending across a lower area of the PET substrate and covering at least a portion of the first PET part, first connection holes being formed on sides of the piezoelectric film at the lower area of the PET substrate and passing through the first adhesive tape part and the lower area of the PET substrate, the elastic thread comprising a first part and a second part respectively engaging the first connection holes formed on the sides of the piezoelectric film; and
    a second adhesive tape part extending across the piezoelectric film at the other end of the piezoelectric film, a second connection hole being formed through the second adhesive tape part and the second PET part and engaging the sewing thread.

* * * * *